United States Patent [19]

Umeda et al.

[11] 4,031,554
[45] June 21, 1977

[54] MAGNETIC RECORDING AND REPRODUCING APPARATUS

[75] Inventors: Tomoyoshi Umeda; Yoshimasa Haraguchi, both of Tokyo, Japan

[73] Assignee: Beltek Corporation, Tokyo, Japan

[22] Filed: Aug. 19, 1975

[21] Appl. No.: 605,924

[30] Foreign Application Priority Data

Sept. 13, 1974 Japan ............................ 49-105563

[52] U.S. Cl. ................................ 360/73; 242/201; 242/208; 360/74; 360/96; 360/105
[51] Int. Cl.² .................... G11B 5/54; G11B 15/46; G11B 19/24
[58] Field of Search ................ 360/73, 93, 96, 105, 360/74; 242/201–209, 199–200

[56] References Cited

UNITED STATES PATENTS

| | | | |
|---|---|---|---|
| 3,627,185 | 12/1971 | Trammell | 360/93 |
| 3,823,945 | 7/1974 | Milligan | 360/96 |
| 3,849,799 | 11/1974 | Nakamichi | 360/96 |
| 3,862,729 | 1/1975 | Staar | 360/73 |
| 3,875,590 | 4/1975 | Mandish | 360/93 |
| 3,911,495 | 10/1975 | Maruyama et al. | 360/96 |

*Primary Examiner*—Alfred H. Eddleman
*Attorney, Agent, or Firm*—Wenderoth, Lind & Ponack

[57] ABSTRACT

A tape recorder of the auto-reverse type wherein all the tape drives including the constant-speed drive of a tape, the rapid drive thereof, and the change-over between the normal and reverse drives are executed by means of a single capstan employing a single motor as its drive source. All the reel rest drives including the constant-speed drives of reel rests, the rapid drive thereof, the change-over between the normal and reverse drives to be made following the tape drives by the capstan are executed by means of a single idler employing the single motor as its drive source. All the tape controls are achieved by the use of the single capstan, the single idler and the single motor. The change of direction of rotation of the single idler and capstan, is effected by a normal-reverse change-over of the single motor. The operation of alternately bringing the single idler into engagement with or disengagement from the reel rests is attained by the turning force of the normal - reverse change-over of the motor. The change-over of the speeds of rotation of the single capstan as well as the single idler is accomplished by two-stage change-over speeds of the single motor. An electric circuit system includes a circuit which holds the motor at the predetermined constant-speed rotation and thereby effects the constant-speed feed of the tape, a circuit which reliably controls the normal and reverse rotations of the motor in response to a tape inversion command signal, on a circuit which changes-over the motor from constant-speed rotation to high-speed rotation and thereby controls the rewinding and the fast feed of the tape.

7 Claims, 28 Drawing Figures

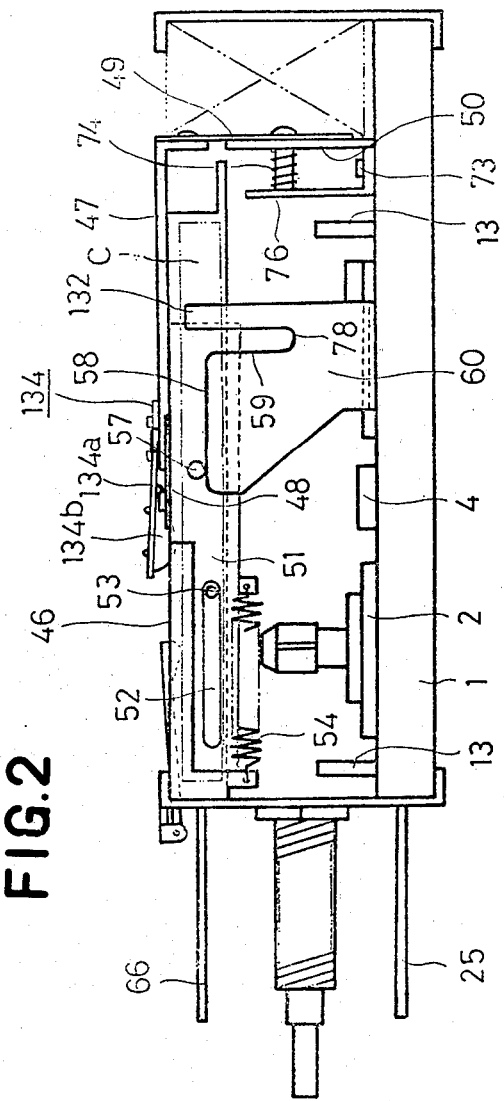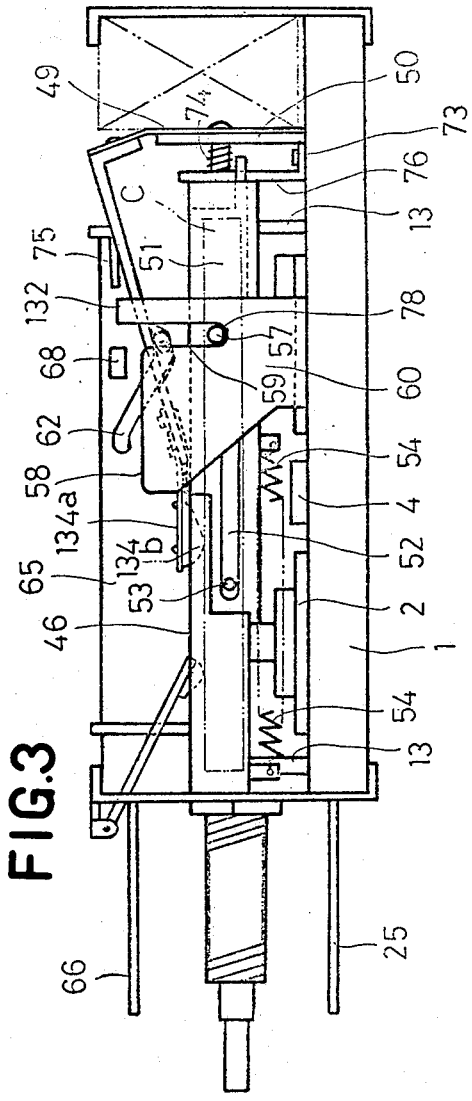

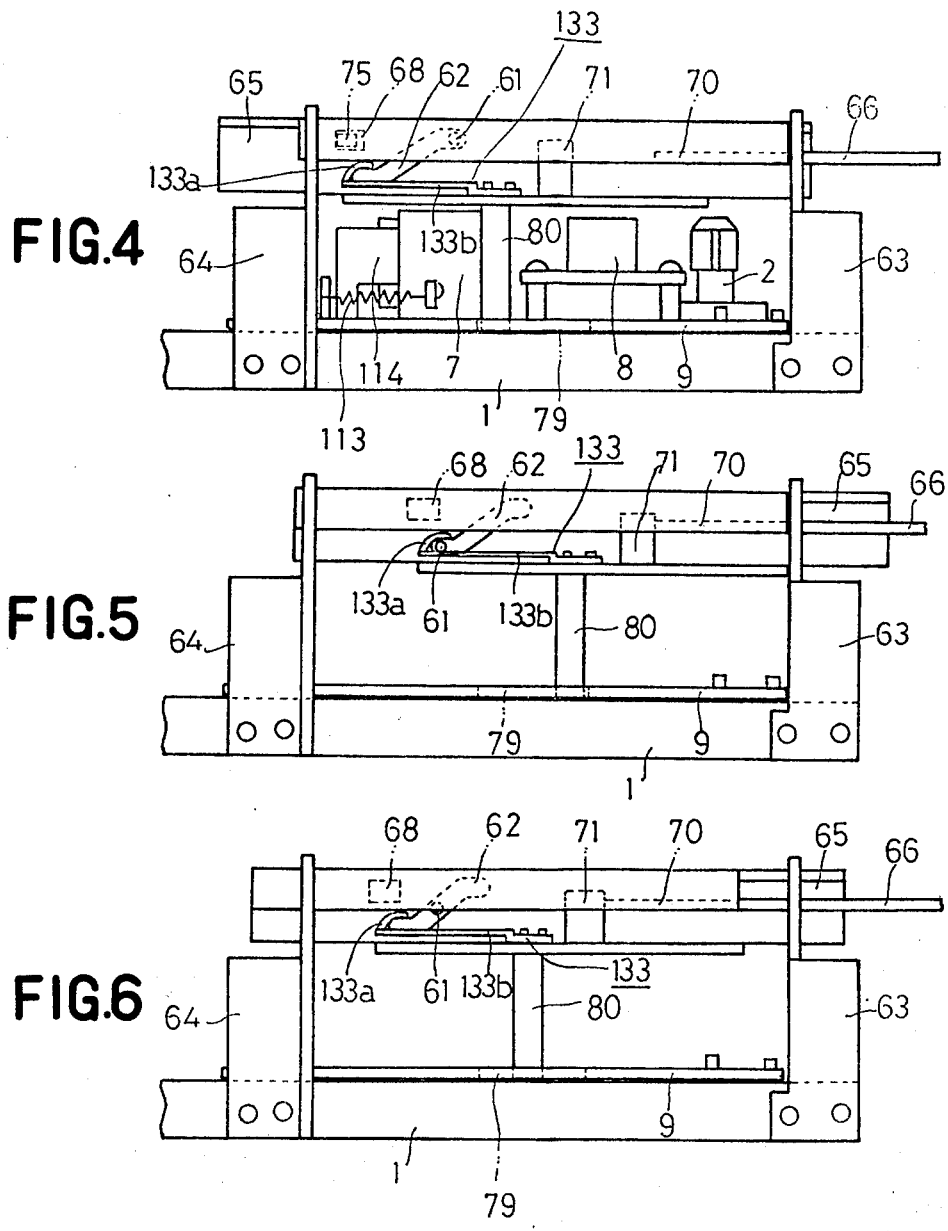

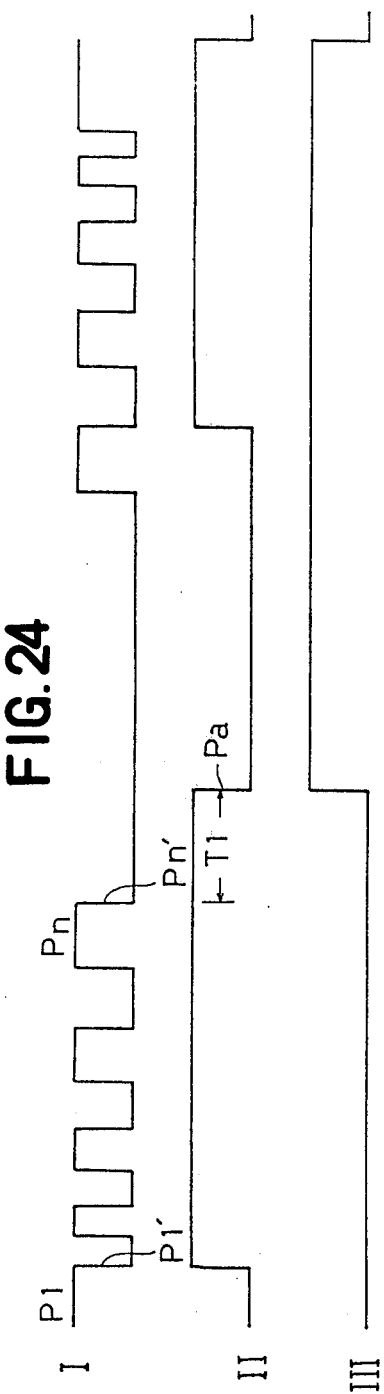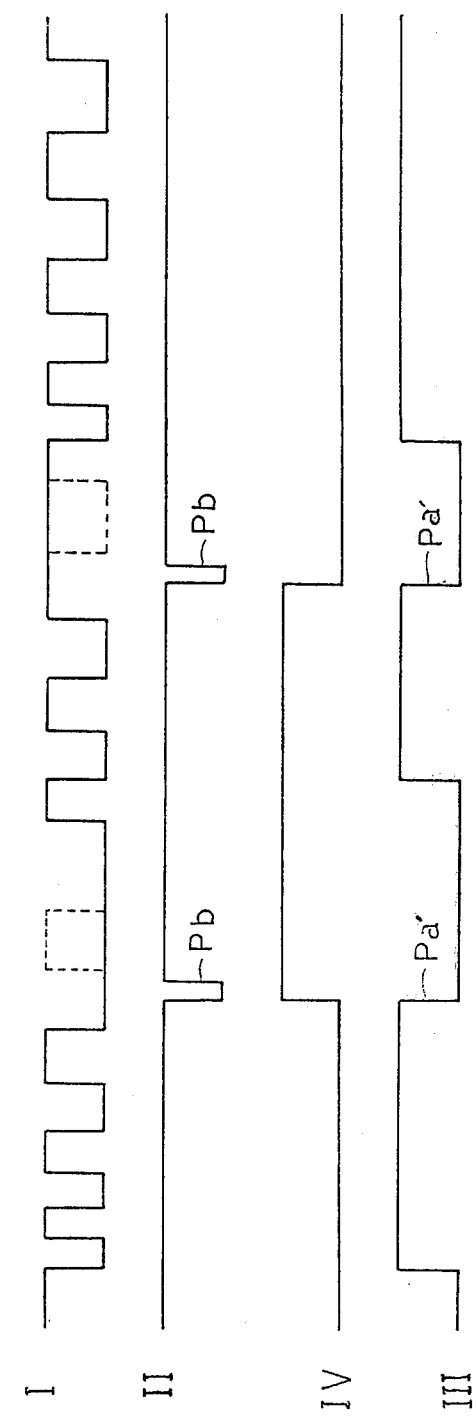

MAGNETIC RECORDING AND REPRODUCING APPARATUS

BACKGROUND OF THE INVENTION

This invention relates to a magnetic recording and reproducing apparatus.

There have heretofore been provided a variety of magnetic recording and reproducing apparatuses wherein the first playback and recording state, under which the reproduction or recording is performed by driving in the normal direction a multitrack magnetic tape wound around two reels, is switched at the end of the tape to the second playback and recording state, under which the reproduction or recording is performed by driving the tape in the reverse direction. Such systems use a pack which contains therein the multitrack magnetic tape wound around two reels. Such apparatus includes a mechanism which brings a pair of idlers into engagement with and disengagement from two reel rests in an alternate change-over manner, the idlers being disposed in correspondence with the reel rests for rotating the reels, and which thereby drive the reel rests. Another mechanism effects the normal and reverse tape drives by employing a pair of sets each consisting of a capstan and a pinch roller. A pinch roller change-over mechanism changes-over the pinch rollers alternately so as to bring them into engagement with and disengagement from the corresponding capstans, and it includes a plunger for inverting the tape drive. An idler change-over mechanism changes-over the idlers alternately so as to bring them into engagement with and disengagement from the corresponding reel rests. Further required is an interlocking mechanism which serves to synchronously operate the paired idler mechanism and the paired pinch roller change-over mechanism. Moreover, a fast feed — rewinding mechanism is necessary. Accordingly, such magnetic recording and reproducing apparatus of the two-capstan and two-idler type system has the serious disadvantage that the number of constituent parts is much larger than in a magnetic recording and reproducing apparatus of the conventional one-capstan system. This renders the organization complicated, degrades the reliability of the equipment, and becomes the cause of high cost. Further, the increase of the number of components and the complicated organization hinder the miniaturization of the structure of the apparatus. At present, the foregoing apparatuses are generally put into practical use as cassette type tape recorders of the auto-reverse type system.

SUMMARY OF THE INVENTION

An auto-reverse type tape recorder provided by this invention is characterized in that the number of components relating to the capstan, the pinch roller and the idler is reduced to half in comparison with the number in the prior-art equipment, and that all the change-over mechanisms and interlocking mechanisms for the capstan, the pinch roller and the idler and accordingly parts for the mechanisms such as plungers become unnecessary, so that the organization is remarkably simplified. Principal components required by this invention are a single capstan as well as pinch roller, a single idler and a single motor. Some components are needed for moving the idler horizontally. With two belts for transmitting the drive of the motor to the capstan and the idler, all the necessary operations are attained merely by electrically controlling the motor. Since, in this manner, the organization is simple and the number of components is small, the reliability of the machine is remarkably enhanced and the occurence of operating difficulties is sharply reduced.

That is, it is an object of this invention to sweep away the aforecited disadvantages in organization as involved in the prior-art equipment, i.e., the greater number of constituent components, the complication of the organization, the large size of the equipment, the increase in cost, and the many problems of performance due to the above.

More specifically, this invention is characterized, in such a tape recorder of the auto-reverse type system, in that all the reel rest drives, such as constant-speed drive, rapid drive and normal — reverse drive change-over of the reel rests, to be made following the tape drive of the capstan are executed by a single idler employing the single motor of the normal — reverse rotation change-over drive type as its drive type as its drive source, whereby the tape drive is made stably. By the joint use of the one-capstan system which is provided by this invention and in which all the tape drives, such as the constant-speed drive, the rapid drive and the normal — reverse drive change-over of the tape are executed by the single set of capstan and pinch roller employing the single motor as its drive source, the characterizing feature is further promoted, and an epoch-making auto-reverse cassette tape recorder is provided which intends to achieve all the tape controls by the use of the single idler, the single capstan and the single motor. The tape recorder is characterized in that the changes of the direction of rotation of the single idler, i.e., the inversions of the tape drive are all effected by the normal — reverse change-over of the single motor, that the operation of alternately bringing the single idler into engagement with or disengagement from the reel rests is attained by the turning force of the normal — reverse change-over of the motor, and that the change-over of the speeds of rotation of the single idler is made by two-stage change-over speeds of the single motor. Thus, with the single motor, the one idler or the one capstan employing it as the drive source is controlled to constant-speed rotation or to rapid rotation, and moreover, the change-over of the rotating direction is made possible and all the tape controls are made possible.

Another object of this invention is to provide, in a magnetic recording and reproducing apparatus with the single set of capstan and pinch roller, a tape drive mechanism wherein the rotational torque of the head side reel rest is made larger than that of the capstan side reel rest by an amount of torque which is reduced due to the tape contact friction of the magnetic head, whereby stable normal and reverse drives of the tape are always attained and the optimum recording or playback operation is provided, and whereby any situation in which the tape is severed or gets entangled round the outer periphery of the capstan and/or the pinch roller on account of the reduction of the rotational torque of the head side reel rest is prevented from occuring.

Another object of this invention is to provide a magnetic recording and reproducing apparatus wherein, owing to the adoption of the single capstan and pinch roller system based on the single-motor normal — reverse drive system, the auto-reverse mechanism is simplified in the extreme, one of flywheels in the conventional two-capstan system becomes unnecessary and a flywheel is made as large as possible beyond the axis of a capstan inserting hole of the tape pack body, so that stable normal and revese drives of the capstan are attained and that stable normal and reverse travels of the magnetic tape are attained, whereby the optimum recording or playback state can be offered without any loosening or entangelement of the tape or any deformation of the pinch roller.

Further, in such tape recorder of the auto-reverse system, this invention effects all the tape drives, such as the change-over between the constant-speed drive and the rapid drive and the change-over between the normal and reverse drives, by changing the speed of the single motor in two stages. With the single motor, the one idler and the one capstan which employ the motor as the drive source are controlled to the constant-speed rotation or to the rapid rotation. Moreover, the changeover of the rotating direction is effected. Thus, all the tape controls are possible by the control of the single motor, and all the tape drive controls are perfectly made by a peculiar electric circuit, whereby it is intended to simplify the prior-art organization as far as possible.

In the above, some of the fundamental features of this invention have been stated. In actualizing the fundamental features, this invention includes a number of features derived therefrom. An actuating mechanism of a tape pack receiving container, a tape pack eject mechanism, and other mechanisms and electric circuits necessary for the magnetic recording and reproducing apparatus include a variety of specific designs. These features will become apparent from the following description of the construction and function of one embodiment, and this invention includes all such features.

BRIEF DESCRIPTION OF THE DRAWINGS

FIG. 2 is a right side view showing a state in which a container is at an upper position, FIG. 3 is a right side view showing a state in which the container is at a lower position, FIGS. 4, 5 and 6 are left side views of a container actuating mechanism in states in which the container is at the upper position, is at the lower position and is moving from the lower position towards the upper position, respectively, FIG. 18 is a view illustrating the operation of a fast feed — rewinding manipulation lever, while FIGS. 24 and 25 are timing charts of various signals of the electric circuit system in FIG. 23.

DETAILED DESCRIPTION OF THE INVENTION

Figure 1:
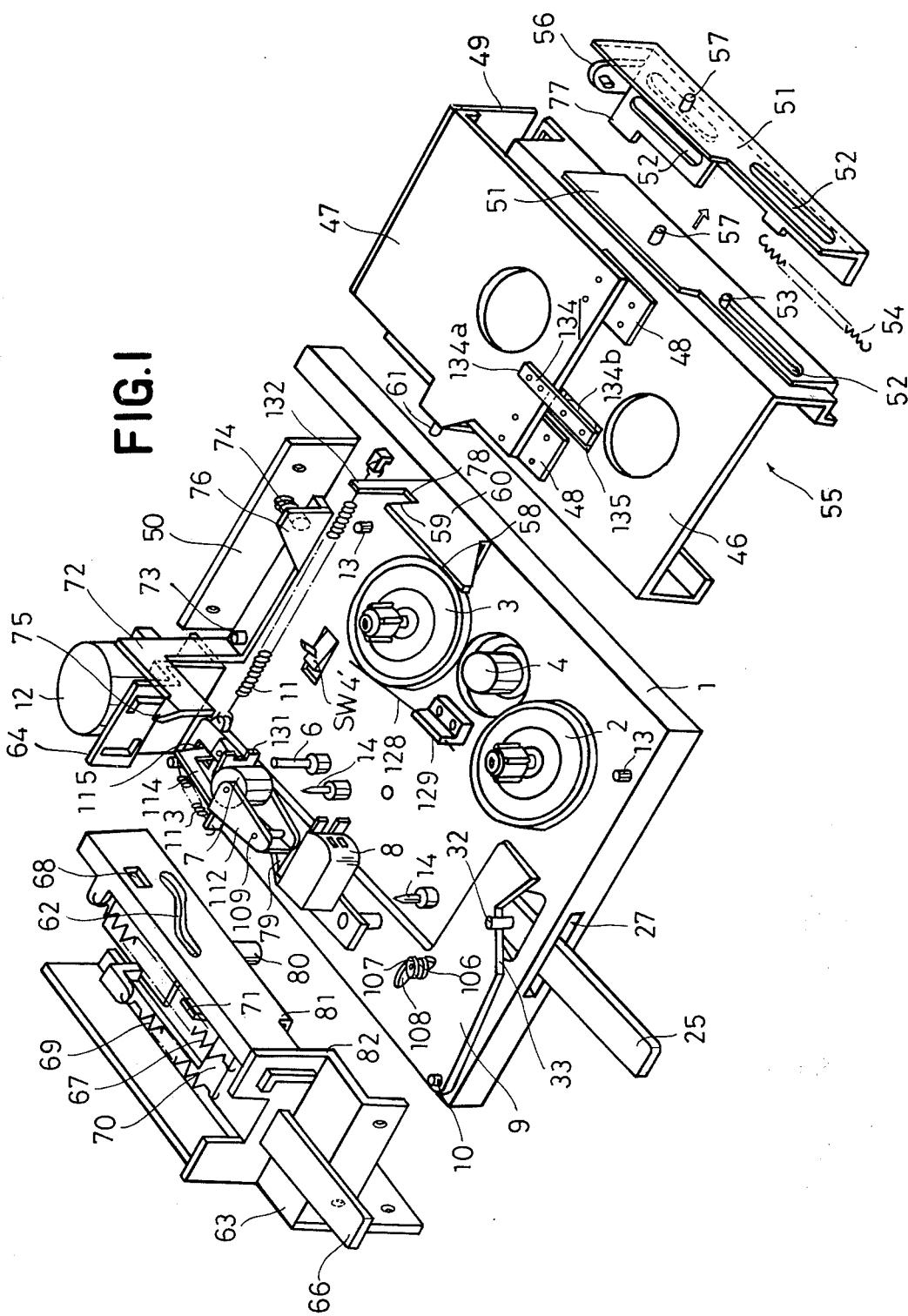
FIG. 1 is an exploded perspective view of a magnetic recording and reproducing apparatus with a tape entanglement preventing device according to this invention.

The drawing illustrate an example in which this invention is applied to a cassette tape recorder.

Figure 15:
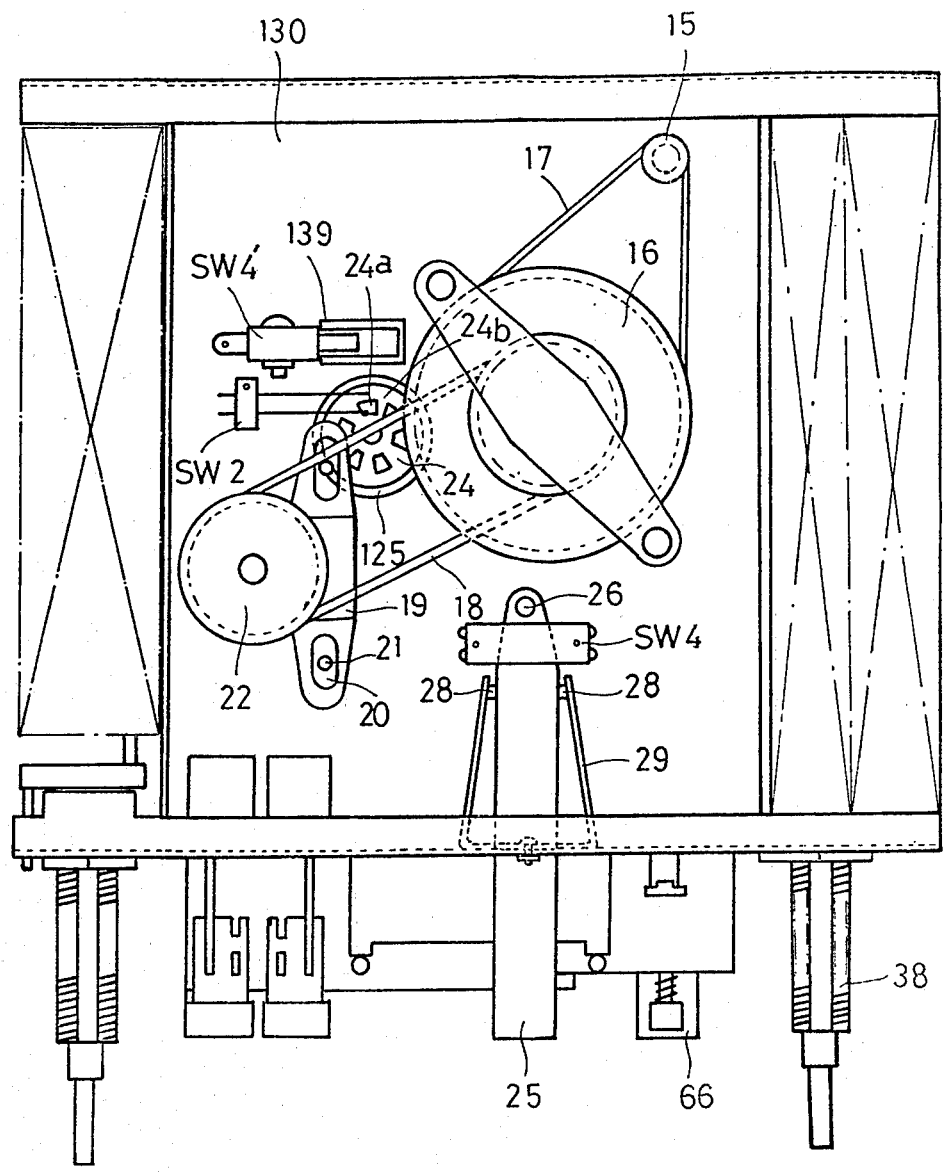
FIGS. 15A is a bottom view of the whole apparatus.
FIG. 15B is a plan view showing a printed wiring board.
FIG. 15C is a sectional view showing a state in which the printed wiring board and a chassis are mounted.
Figure 15:
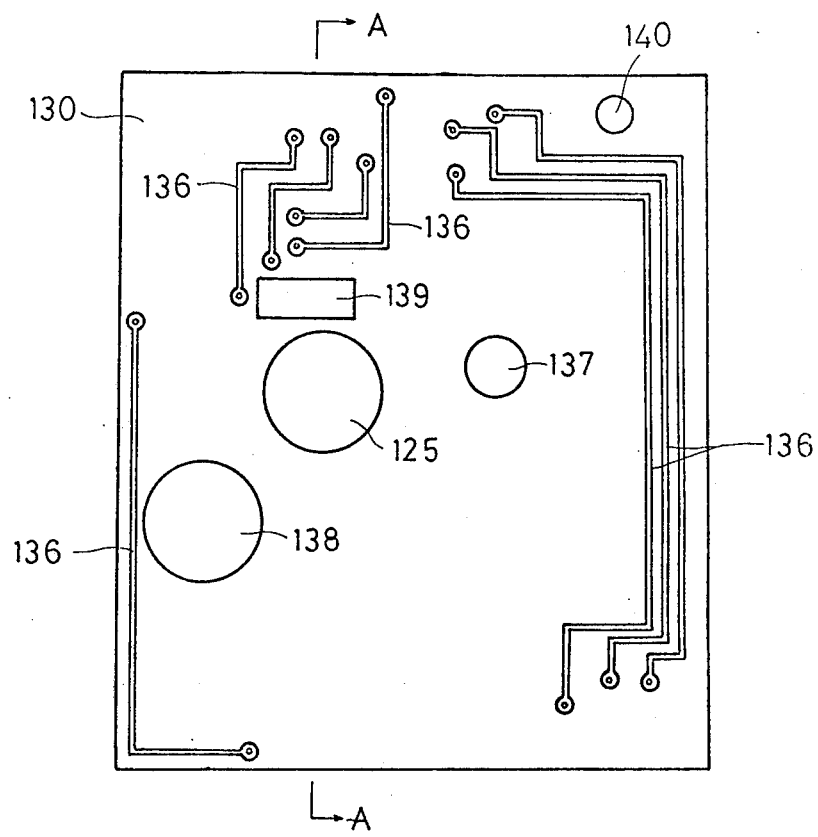
Figure 15:
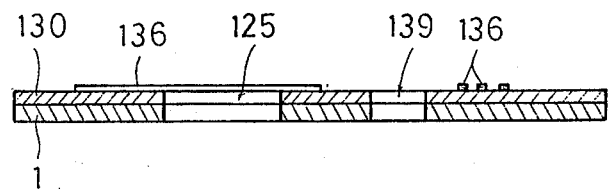
Figure 16:
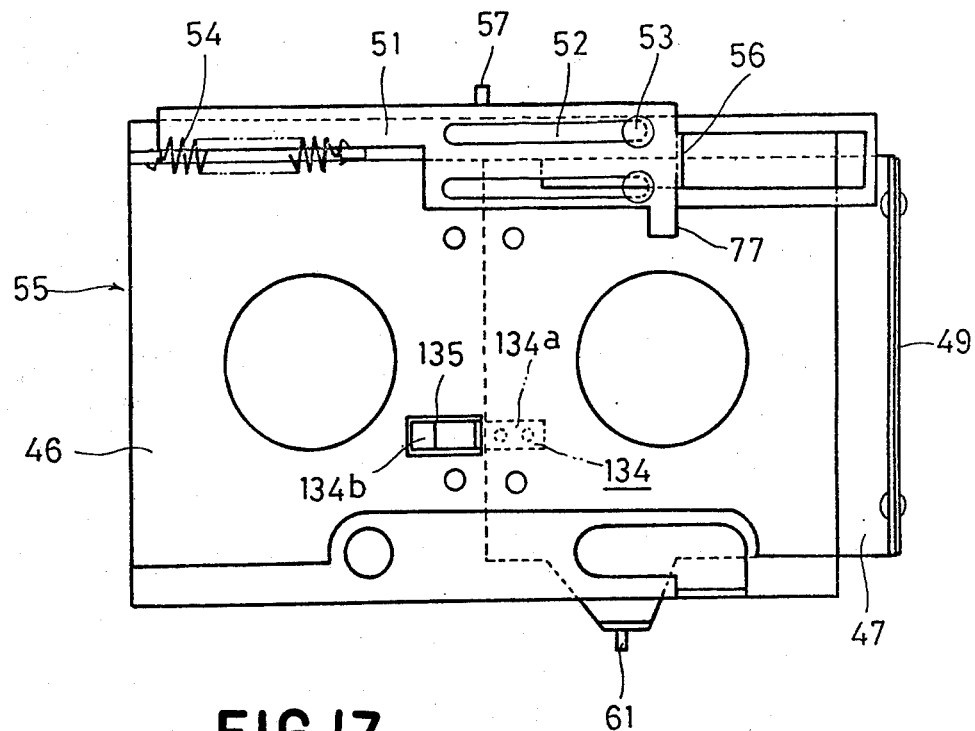
FIG. 16 is a reverse side view of the container, FIG,. 17 is a perspective view of the essential portions of a tape driving mechanism.

FIG. 1 is an exploded perspective view of the external appearance of the internal organization of the tape recorder, especially the external appearance of a chassis 1 as well as components belonging thereto, a container 46, an operating mechanism of the container, etc. Referring to the FIGURE, a pair of reel rests 2 and 3 are disposed on the chassis 1, while only one idler 4 is disposed between rests 2 and 3. In front of these components 2 to 4, only one set of capstan 6 and a pinch roller 7 is arranged. Further, there are provided a head plate 9 which supports the pinch roller 7 and a magnetic head 8, and a motor 12 which is only one driving source. Supporting pins 13 and locating pins 14 for holding up the underside of a tape pack are provided on the chassis 1. Shown at SW4' is a power switch which turns "on" when pushed by the tape pack underside. A printed wiring board 130 (FIGS. 15A, 15B and 15C is provided on the underside of the chassis 1 in a manner to lie one upon another. Thus, all wiring connections are made through the printed wiring board 130. Heretofore, vinyl-covered lead wires have been used for all the electric circuit connections of various components such as, for example, the connection between a power circuit and a power switch; the connection between a quick feed — rewinding changeover switch and a motor controlling circuit; connections between a head, a volume switch, etc. and a sound reproducing circuit (including an amplifier circuit); and connections between a rotation detecting switch for the auto-reverse operation, a switch for the manual reverse operation, etc. and electric circuitry. This has involved a number of disadvantages. More specifically, due to the complicated intersections of many lead wires beneath the chassis 1, the connecting job is troublesome and inefficient, and besides, erroneous wiring connections are prone to be caused. Since the soldered connections are insufficient, the soldered parts are sometimes disconnected. Repairs and reconnections require much labor. In addition, the wiring connections occupy a large space, which is unfavorable for mounting the components.

In contrast, according to this invention, these disadvantages are fully avoided because all the wiring connections are performed by the printed wiring board 130 which is attached to the underside of the chassis 1 in a manner to lie one upon another. As is well known, printed wiring boards can be mass-produced beforehand and be readily assembled. An assembler may attach the printed wiring board 130 to the underside of the chassis 1 together with other components, and connect the input and output ends of various circuits or components to conductive lines 136 on the printed wiring board 130. Thus, all the wiring connections can be executed without employing any lead wires.

As shown in FIGS. 15A, 15B and 15C, in the printed wiring board 130 there are previously punched a hole 137 for inserting the capstan 6 therethrough an inserting hole 138 for the idler 4, a fitting hole 139 for the power switch SW4', a hole 140 for a motor driving shaft, and other necessary holes or notches. The aforecited conductive lines 136 required for the connections between the various components and electric circuits are printed on the board 130. After mounting the printed wiring board 130 on the underside of the chassis 1 in superposition thereon, the job of assembling the components to the chassis 1 can be executed without hindrance. The ends of the conductive lines 136 are previously led to positions for mounting the components, and the connections can be made very easily, without error and efficiently at the positions at which the components are mounted. In this way, the time required for connection and assemblage is sharply reduced. Besides, it never occurs that the wiring connections will come off or short-circuit due to a shock, vibration or the like. Considering that the wiring connections of in the prior art as have complicated intersections and exist in the form of thick bundles, the space necessary for the wiring connections of this invention is remarkably smaller. The printed wiring board 130 serves also to reinforce the chassis 1, and the strength of the overall unit is conspicuously increased by the superposed body composed of the board 130 and the chassis 1.

Figure 17:
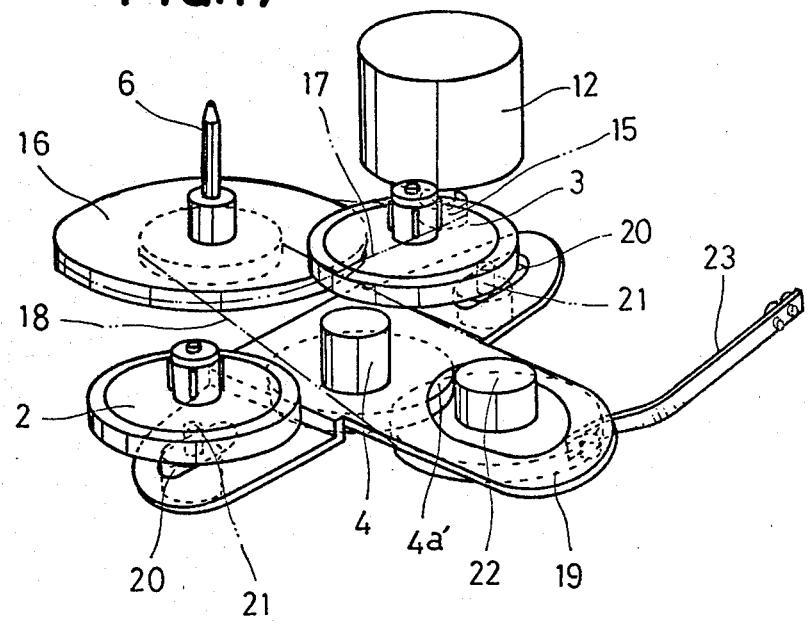
Figure 20:
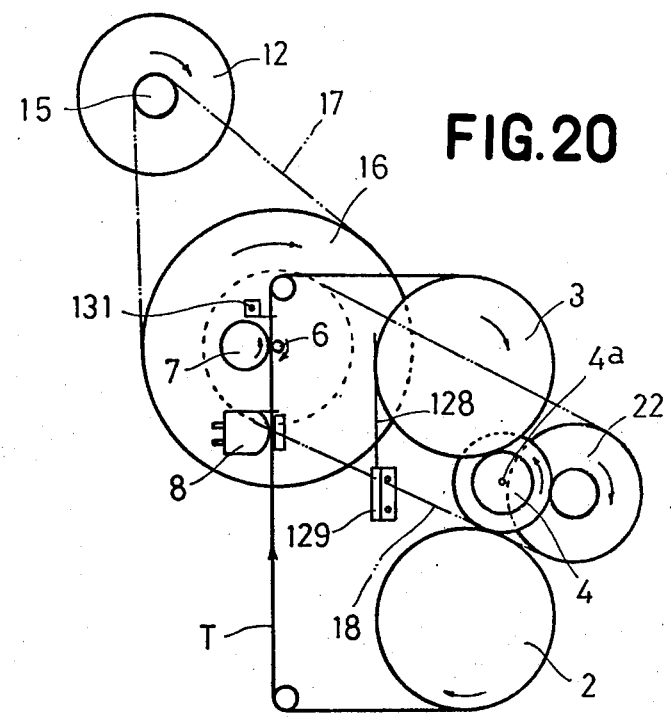

The head plate 9 is pivotally supported on the chassis 1 by an arbor 10. At the end of the head plate 9 remote from the arbor 10, there is retained one end of a spring 11, the other end of which is retained at a fore part of the chassis 1. The tensile force of the spring 11 gives the head plate 9 a frontward force with a fulcrum at the arbor 10. The frontward force as have complicated intersections and exist in the form of pressingly urges the head 8 into contact with a tape. The tape is held between the pinch roller 7 and the capstan 6, and it is driven in conformity with the rotational direction of the capstan 6. The head plate 9 is provided with a keeper spring 106. The keeper spring 106 imparts a downward force to the head plate 9, thus serving to securely support the head plate 9 on the chassis 1 and to prevent the vertical movement of the head plate 9. As illustrated in FIG. 1, an arbor 107 erected on the chassis 1 protrudes beyond an arcuate hole 108 which is provided in the head plate 9. The spring 106 is wound round the protruding part of the arbor 107, and presses the head plate 9 down by the downward elastic force thereof. The pinch roller 7 is attached to a supporting member 112, which is turnably mounted on the head plate 9 by an arbor 109. The supporting member 112 has one end pulled by a spring 113, thereby bestowing a frontward force on the pinch roller 7 so as to pressingly urge to toward the capstan 6. A part 114 of the supporting member 112 is loosely fitted in a hole 115 provided in the head plate 9, and it forms a stopper for the supporting member 112. When, as shown in the FIGURE, the head plate 9 is back to a recording or reproduction standing-by position, the stopper 114 checks the rotation of the supporting member 112 and prevents the pinch roller 7 from remaining in the pack. The idler 4 comes into contact with the take-up side of the paired rests 2 and 3 following the tape drive, and imparts thereto a rotation driving force in the same direction as the rotation of the capstan 6. The motor 12 is the single driving source which bestows the rotation driving force on the single capstan 6 and the single idler 4. The normal and reverse constant-speed drives of the capstan 6 and the idler 4 at recording and reproduction, the normal and reverse rapid drives at fast feed and rewinding, and the normal — reverse change-overs of the constant-speed and rapid drives are carried out in such way that the speed of rotation of the one and only motor is changed in two stages and that the direction of rotation is switched between the normal and reverse directions. As regards electric circuitry for the normal — reverse change-over and the speed control of the motor, there is provided a control method to be discussed below as has been originally developed by the inventor. As best understood from FIG. 17, the rotational drive of the capstan 6 is acquired by extending a belt 17 over a motor pulley 15 and a flywheel 16 provided on the shaft of the capstan. Likewise, the idler 4 obtains a rotational drive force either directly from the motor 12 or indirectly from the flywheel 16 through a belt 18. As seen from the FIGURE, the idler 4 lies substantially halfway between the reel rests 2 and 3. It is carried on a supporting plate 19 in a manner to be slidable and turnable with a certain friction torque. The supporting plate 19 is supported to be rockable over a certain range in such way that fixed pins 21 erected on the chassis 1 are loosely fitted in slots 20 provided at the right and left ends of the plate 19. On the other hand, a pulley 22 is disposed which rotates at a fixed position on an intermediate line between the reel rests 2 and 3. A spring 23 resiliently urges a pulley 4a' which rotates integrally with the idler 4 into contact with the pulley 22 by an urging force of the spring 23 urging plate 19 in one direction. The driving force of the motor 12 is given to the pulley 22 by the belt 18 and rotates it in accordance with the direction of rotation of the motor. The turning force of the pulley 22 is transmitted to the pulley 4a' lying in pressed contact therewith, and in turn, the turning force of the pulley 4a' is transmitted to the idler 4. Assuming now that, as shown in FIG. 20, the motor pulley 15 rotates clockwise, both the capstan 6 and the pulley 22 rotate clockwise. At the same time, the idler 4 revolves on its axis counter-clockwise conversely to the rotation of the pulley 22 due to its frictional contact with the pulley 22. Also, idler 4 involves or is rocked around the axis of extending along the outer circumference of the pulley 22. The permission of such motions will be readily understood because the idler 4 is supported on the rockable supporting plate 19 and is held in pressed contact with the outer circumference of the pulley 22 and because the pulley 22 imparts to idler 4a fixed friction torque. The idler 4 lies in pressed contact with the reel rest 3 due to such revolution round the pulley 22, and it bestows a clockwise turning force to the reel rest 3 owing to such revolution on its axis. When the rotation of the reel rest 3 is attained, the idler 4 is normally urged into a to be direction wedged between the reel rest 3 and the pulley 22 by virtue of the turning force of the reel rest 3 and that of the pulley 22. Therefore, the idler 4 is held firmly and stably in position. It operates as if it rotated by means of a stationary shaft 4a, and it is never liberated from the reel rest 3.

Figure 21:
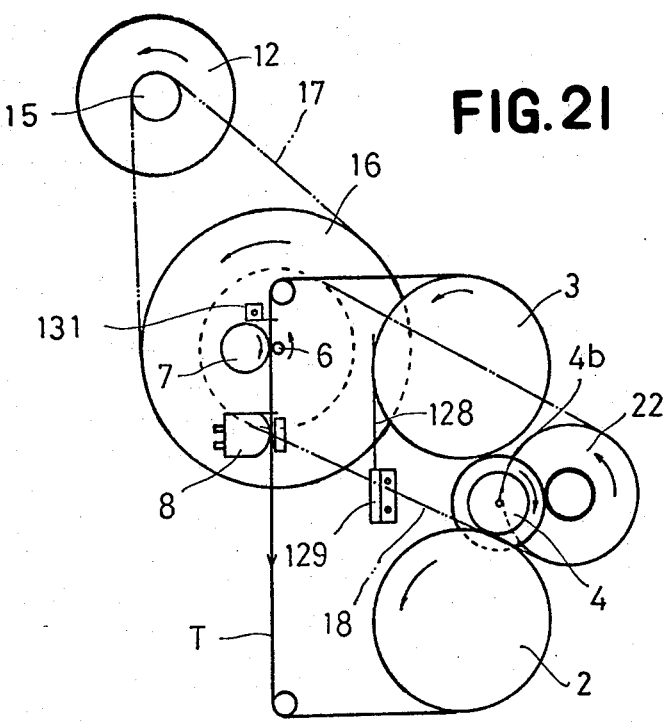

As described above, the drive of the capstan 6 and the drive of the idler 4 as well as the contact of the same with the reel rest 3 are achieved by the single motor 12. The reel rest 3 is accordingly driven. Thus, the tape T is driven in the predetermined direction and is wound around the reel rest 3 so as to enable a reproduction or a recording operation. At this time, if the motor 12 is controlled to the rapid drive, the idler 4 and the capstan 6 will be rapidly driven to rewind the tape T round the reel rest 3 or feed it fast. When, under such state, it is desired to reverse the direction of drive of the tape, such can be readily accomplished merely by reversing the rotation of the motor 12. More specifically, when a tape inversion signal is issued upon arrival of the tape T at its terminus, or when the tape inversion signal is issued through the switch manipulation of a user in the course of the recording or reproduction operation, the rotation of the motor 12 is converted from the clockwise direction to the counterclockwise direction. Then, as illustrated in FIG. 21, both the capstan 6 and the pulley 22 associated by the belts 17 and 18 rotate counter-clockwise. At the same time, the idler 4 supported on the rockable supporting plate 19 and held in pressed contact with the pulley 22 revolves on its axis clockwise conversely to the rotating direction of the pulley 22 due to frictional contact with the pulley 22, while it revolves round the axis of the pulley 22 in a counter-clockwise direction on an orbit extending along the outer circumference of the pulley 22. The idler 4 lies in pressed contact with the reel rest 2 owing to such revolution round the pulley 22, and it bestows a counterclockwise turning force to the reel rest 2 owing to such revolution on its axis. When the rotation of the reel rest 2 is produced, the idler 4 is normally urged into a direction to be wedged between the reel rest 2 and the pulley 22 by virtue of the turning force of the reel rest 2 and that of the pulley 22. Therefore, the idler 4 is held firmly and stably in position. It operates as if it rotated by means of a stationary shaft 4b, and it is never liberated from the reel rest 2. As set forth above, the reverse drive of the capstan 6 and the reverse drive of the idler 4 as well as the contact of the same with the reel rest 2 are achieved by the single motor 12. The reel rest 2 is accordingly driven in a reverse direction. Thus, the tape T is driven in the direction converse to the above discussed direction and is wound around, the reel rest 2 so as to enable a reproduction or a recording operation. At this time, if the motor 12 is controlled to the rapid drive, the idler 4 and the capstan 6 will be rapidly driven in a reverse direction under the same action as in the above description and will rewind the tape T around the reel rest 2 and feed it fast.

From the above explanation and the illustration referred to, it is understood that the reverse mechanism according to this invention is composed of a very small number of components and that it is extremely simplified. The components required by the reverse mechanism are the single capstan 6, the single pinch roller 7 and the single motor 12, to which auxiliary means consisting of some members such as the pulley 22 for controlling the revolutions of the idler 4 on its axis and round the pulley 22 and the direction of rotation of the idler 4 are merely added. All the tape controls necessary for the auto-reverse system tape recorder are perfectly carried out by controlling the drive of the single motor 12. In view of the very complicated mechanisms of conventional articles, it will be instantly understood that such fundamental mechanism of this invention is greatly contributive to the reduction of operating difficulties, the enhancement of mechanical reliability and the miniaturization of the equipment.

Figure 22:
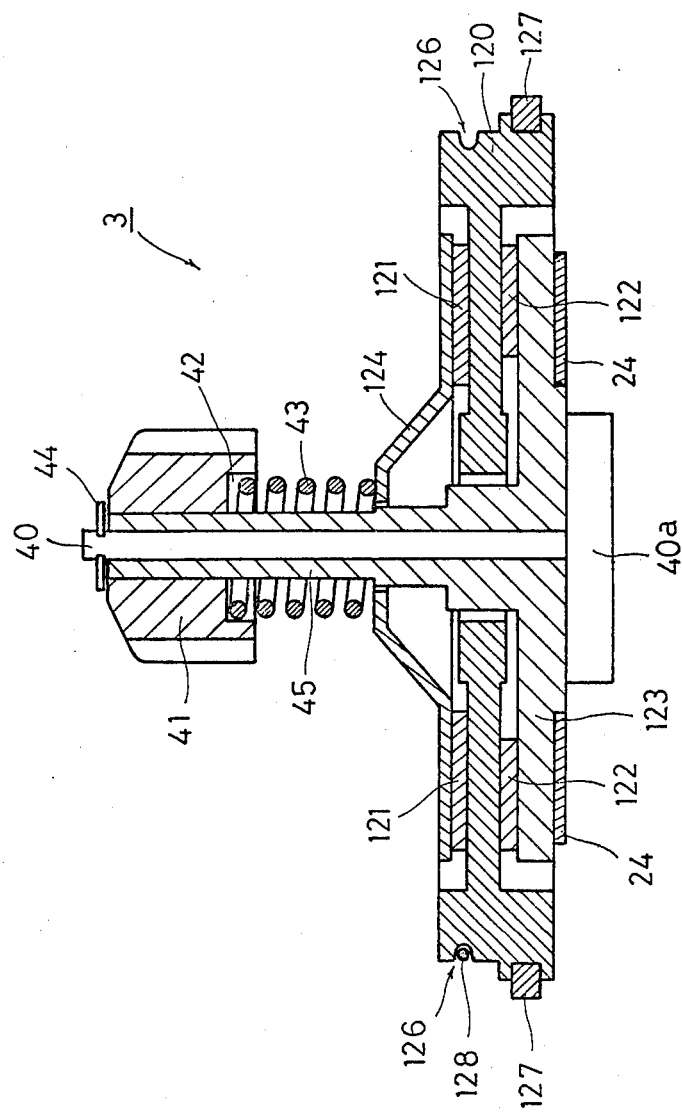
FIG. 22 is a sectional view of a reel rest.

The controls of the motor 12 required for the performance of the reverse mechanism consist basically in the controls of the change-over between the constant-speed drive and the rapid drive and the change-over between the normal and reverse rotations in the constant-speed drive as well as the rapid drive as has already been stated. The constant-speed drive is needed for the reproduction and recording uses of the tape, while the rapid drive is needed at the rewinding and fast feed of the tape. This invention also provides an electric circuit system which is built in conformity with the particular control method in order to perfectly put into practical use the mechanism involving the various controls of the motor 12. Concretely, this method is based on a very effective and simple expedient which exploits the fact that whenever the tape is inverted, the reel rests 2 and 3 stop and the tape T stops, and in which the temporary stop of the tape is detected by an electric signal, certain trigger signals are produced on the basis of the detection signal and the control systems of the motor and head change-overs etc. are simultaneously controlled on the basis of the trigger signals. FIG. 15A and FIG. 22 show a tape rotation-detecting switch SW2 and a printed wiring board 24 therefor. As illustrated, the printed board 24 is mounted on the back of one reel rest 2 or 3 so as to rotate integrally therewith. A non-conductive portion 24a and a conductive portion 24b are arranged at the shortest possible intervals on a circumference of the printed board 24, and the switch SW2 is fixed at a position at which two contact pieces of the switch lie in contact with the respective portions. When the reel rests 2 and 3 are rotating, the switch SW2 is periodically turned on and "off" by the printed wiring board 24. When the reel rests 2 and 3 stop, the periodic on – off operation is temporarily stopped. The switch SW2 is indicated by the same symbol in a block diagram (FIG. 23) which shows the fundamental electric circuitry of this invention and in a circuit diagram (FIG. 26) of an actual circuit constructed on the basis of the fundamental circuitry. As illustrated in FIG. 24, during the period during which the switch SW2 is turned on and off periodically, pulse signals corresponding to the periods of on and off are repeatedly outputted. The periods of the pulse signals I gradually lengthen as the travelling speed of the tape becomes slower and slower with the proceeding of the winding. When the tape is perfectly stopped, the last pulse signal $P_n$ is delivered with the longest period, and the tape end stop is detected.

Figure 23:
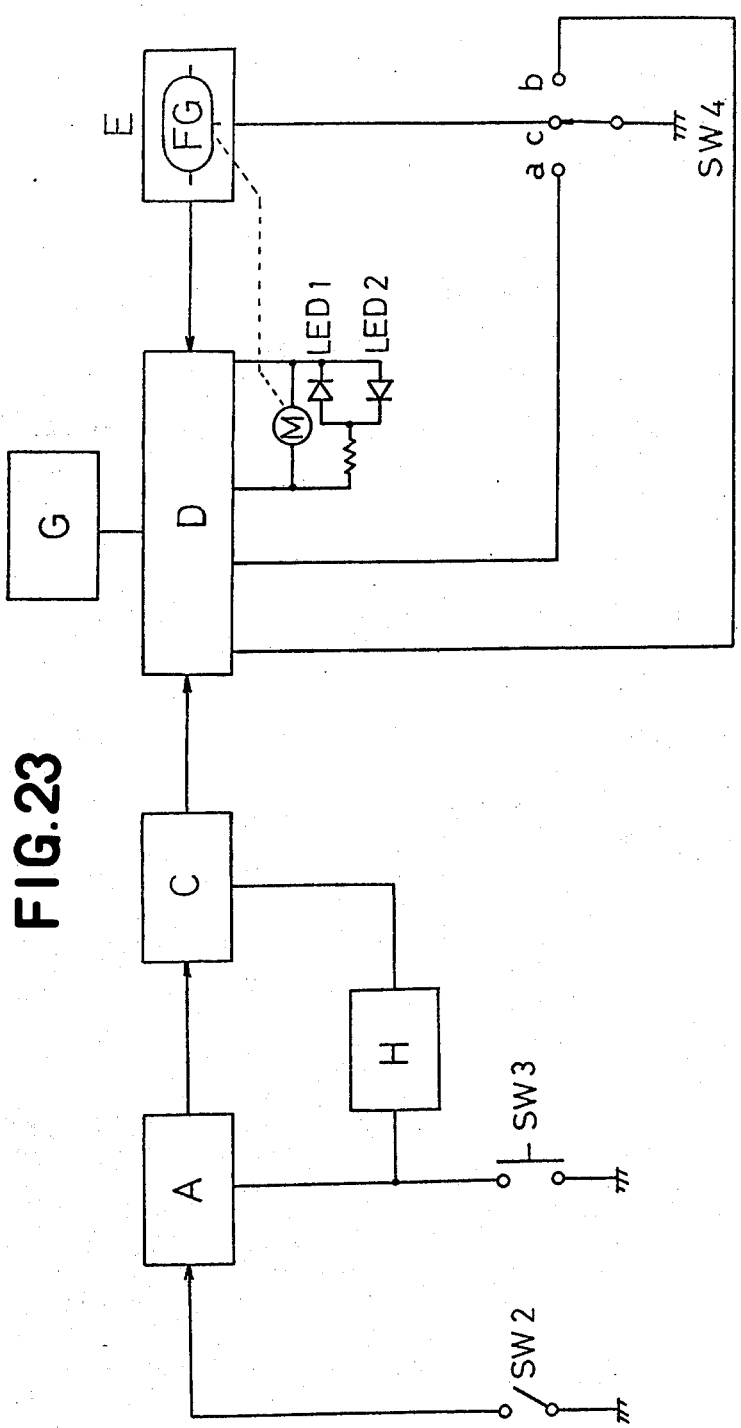
FIG. 23 is a block diagram showing an electric circuit system.

As shown in FIG. 23, a fixed terminal of the switch SW2 is connected to a trigger circuit A, to which the signals I outputted from the switch SW2 are normally applied while the tape travels. Referring also to FIG. 24, the trigger circuit A starts at the fall part or trailing edge $P_1'$ of the first one $P_1$ of the signals I, to output a continuous high-level signal II as shown in the figure. Owing to the fall part or trailing edge $P_n'$ of the last output signal $P_n$ of the switch SW2, the trigger circuit A stops the signal output or the signal II falls down to the low level. As is apparent from FIG. 24, the stop of the signal II is not made immediately by the signal part $P_n'$, but after a certain time constant applied thereto. In order to prevent a malfunction, the time constant $T_1$ is so set as to be longer than the longest output period of the signal $P_n$. Using as a trigger the fall part or trailing edge $P_a$ of the signal II which the trigger circuit A delivers, a control circuit for the motor 12 to be discussed later is controlled. In this sense, the block A is called the trigger circuit and it occupies the mainstay-like status of the command system. As the most appropriate circuit having such function, this invention employs a re-trigger type one-shot multivibrator circuit.

Further, a block C is connected on the output side of the trigger circuit A. The block C is a tape inversion command signal output circuit, an output signal of which is applied to a motor normal — reverse control circuit D and controls the direction of rotation of the motor. On the other hand, an output signal of a motor constant-speed control circuit E is applied to the motor 12 through the normal — reverse control circuit D and controls the constant speed of the motor. The circuit C is triggered by the fall part $P_a$ of the signal II outputted from the trigger circuit A, and simultaneously with the application of the trigger signal, it has its output polarity inverted and delivers a signal III at a high level. In dependence on the polarity of the signal, for example, on whether the signal is (+) or (−), the rotation of the motor 12 is changed to the reverse rotation by the motor normal — reverse control circuit D. Thus, the auto-reverse operation is attained. Until the next command signal $P_a$ is produced, the signal III continues to self-maintain the high level and holds the normal or reverse rotation of the motor 12. Accordingly, the reverse state is kept until the tape reaches the next terminal. When the tape arrives at the terminal again, the signal III is inverted in the output polarity and falls down to the low level again. In correspondence with this polarity, the motor 12 is reversely rotated again, and the tape is driven in the forward direction again. As the circuit which, as thus far explained, inverts the output polarity at each trigger and controls the direction of rotation of the motor 12 in conformity with the polarity, a T-type flip-flop circuit is used most suitably. The output of the T-type flip-flop circuit is applied also to a head change-over circuit G. Thus, simultaneously with the tape inverting operation, the scanning channel of the head is changed-over in dependence on the output polarity. By repeating the various operations stated above, the auto-reverse mechanism functions, and the object of this invention attempting the auto-reverse control of the one-capstan and one-motor system is fully accomplished. Furthermore, this invention disposes a tape travel direction designating circuit H in order that the direction of the tape drive to be initiated for the first time when the tape pack is thrown in and the power supply is closed may be always a fixed direction. The circuit H is a circuit which holds the low level for a certain time when the power supply is turned on. It is composed of resistances and capacitors. As shown in FIG. 23, it impresses the low level signal on the trigger circuit A and the tape inversion command signal output circuit C. The first output polarities of these circuits are controlled so as to be always the same, whereby the first tape drive is held in the fixed direction in accordance with the foregoing principle. In contrast to the switch SW2 which serves to produce the auto-reverse signal, a switch SW3 is a manual switch which serves to manually produce a reverse signal in the course of the recording or reproduction operation. The switch SW3 is a normally-open switch one end of which is grounded and the other end of which is connected to the trigger circuit A. When the user depresses the manual reverse manipulation push button 117 as desired, the switch SW3 turns on to output a signal $P_b$ as shown at (II) in FIG. 25. Due to the signal $P_b$, the trigger circuit A falls into the low level as illustrated at (III) in FIG. 25. Using the signal $P_a'$ as a starting signal, the output signal of the tape inversion command signal output circuit C is inverted as illustrated at (IV) in FIG. 25. As a result, in correspondence with the signal polarity, the rotational drive of the motor 12 is changed from the normal rotation to the reverse rotation or vice versa by the motor normal — reverse control circuit D. Thus, the manual reverse operation is attained. At the same time, the signal of the tape inversion signal output circuit C is applied to the head change-over circuit G, so that the scanning channel of the head is changed-over in response to the signal polarity.

Figure 26:
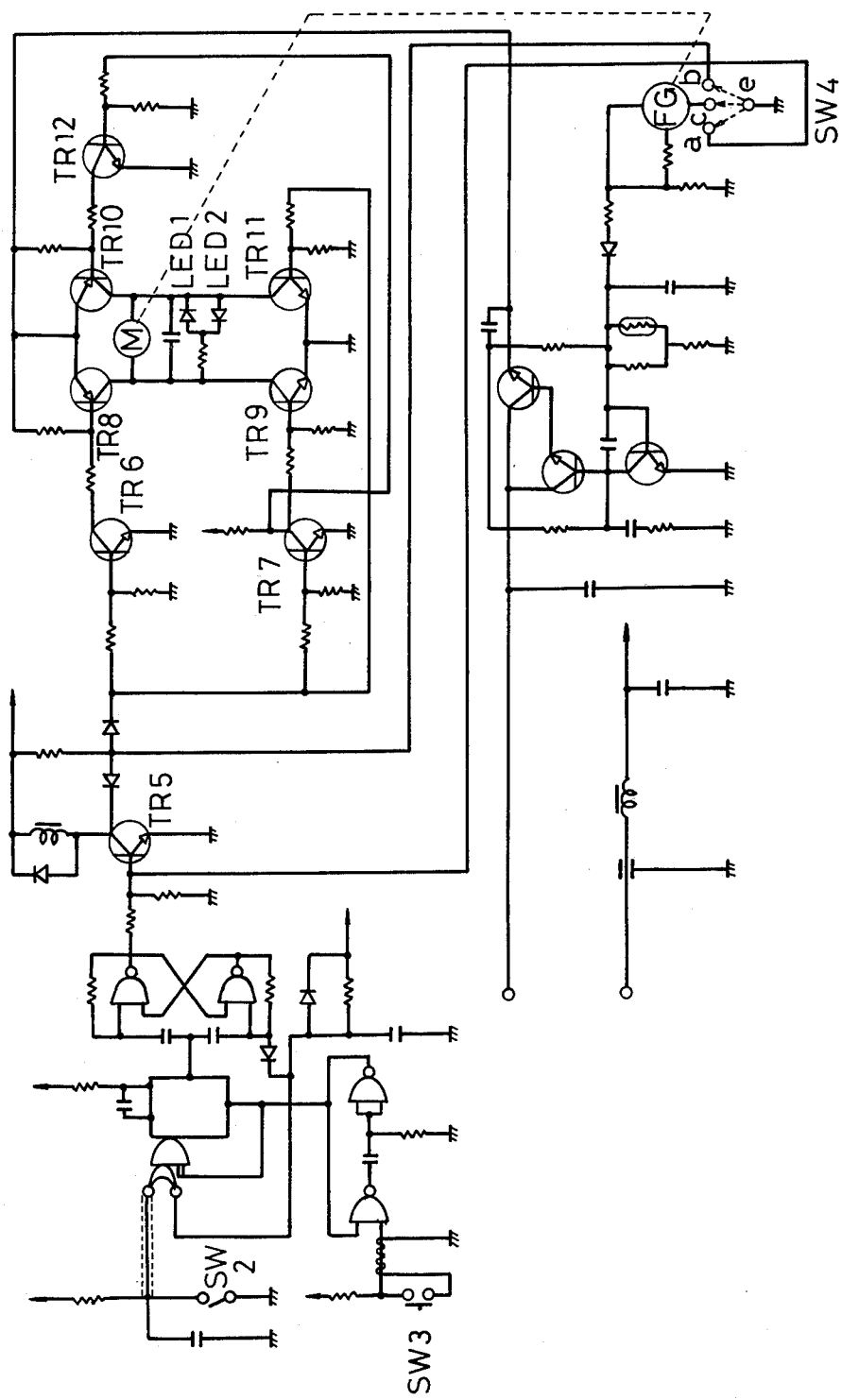
FIG. 26 is a specific circuit diagram corresponding to FIG. 23.

As another feature of the apparatus of this invention, a novel means and method are provided in the control of the motor for changing the constant-speed feed of the tape into a fast forward or rewinding feed. As already stated and as shown in FIGS. 23 and 26, the motor constant-speed control circuit E is connected to the motor normal — reverse control circuit D. Normally, a generator for the constant-speed control FG functions to subject the motor 12 to the constant-speed drive and to control the constant-speed feed of the tape.

The motor constant-speed control circuit E is provided with a fast feed — rewinding change-over switch SW4 which controls the operation of the motor constant-speed control circuit E. The switch SW4 is so arranged as to interlock with the manipulation of the fast feed and rewinding control knob 97. Normally, the switch SW4 is connected to an operating contact c of the motor constant-speed control circuit E, to render the constant-speed generator FG operative and the circuit E operative. The switch SW4 further has a movable contact e of the ground connection, a fast feed change-over contact a and a rewinding change-over contact b. By the change-over connection of the movable contact e to the contact a or b, the constant-speed control generator FG is separated, and the fast feed or the rewinding of the tape is attained. More in detail, the contacts a and b are respectively connected to the motor normal — reverse control circuit D. By changing the switch SW4 to the contact a or b, the motor control by the motor constant-speed control circuit E is released. The polarity of the signal to be applied differs depending on whether the change of the switch is to the contact a or b. In response to the polarity, the motor normal — reverse control circuit D is controlled so as to establish the rapid drive of the motor 12 and the normal drive or reverse drive thereof. While when the switch SW4 is kept connected to the contact c the constant-speed control generator FG functions to effect the constant-speed drive, when the switch is connected to the contact a or b the constant-speed control generator FG is prevented from functioning and the motor is subjected to the rapid drive in the current direction dependent upon the connection of the contacts a and b. As shown by way of example in FIG. 26, the motor normal — reverse control circuit D consists of an N-P-N transistor TR5, and N-P-N transistors TR6 and TR7 in parallel connection. The fast feed change-over contact a is connected to the base of the transistor TR5, while the rewinding change-over contact b is connected to the bases of the transistors TR6 and TR7. The collector of the transistor TR5 is connected to the bases of the transistors TR6 and TR7 constituting the motor normal — reverse control circuit D. Further, the collectors of the transistors TR6 and TR7 are connected to a bridge circuit to be described hereunder as constitutes the motor normal — reverse control circuit D. Thus, the normal and reverse drives of the motor are controlled. By way of example, the bridge circuit is constructed of P-N-P transistors TR8 and TR10 and N-P-N transistors TR9 and TR11. The motor 12 and light emitting diodes for displaying the tape travel directions $LED_1$ and $LED_2$ are connected in parallel with the bridge circuit. The base of the transistor TR8 is connected to the collector of the transistor TR6, and the base of the transistor TR9 to the collector of the transistor TR7. The base of the transistor TR11 is connected to the collector of the transistor TR5, and the base of the transistor TR10 to the collector of a transistor TR12. The base of the transistor TR12 is connected to the collector of the transistor TR7.

Figure 18:
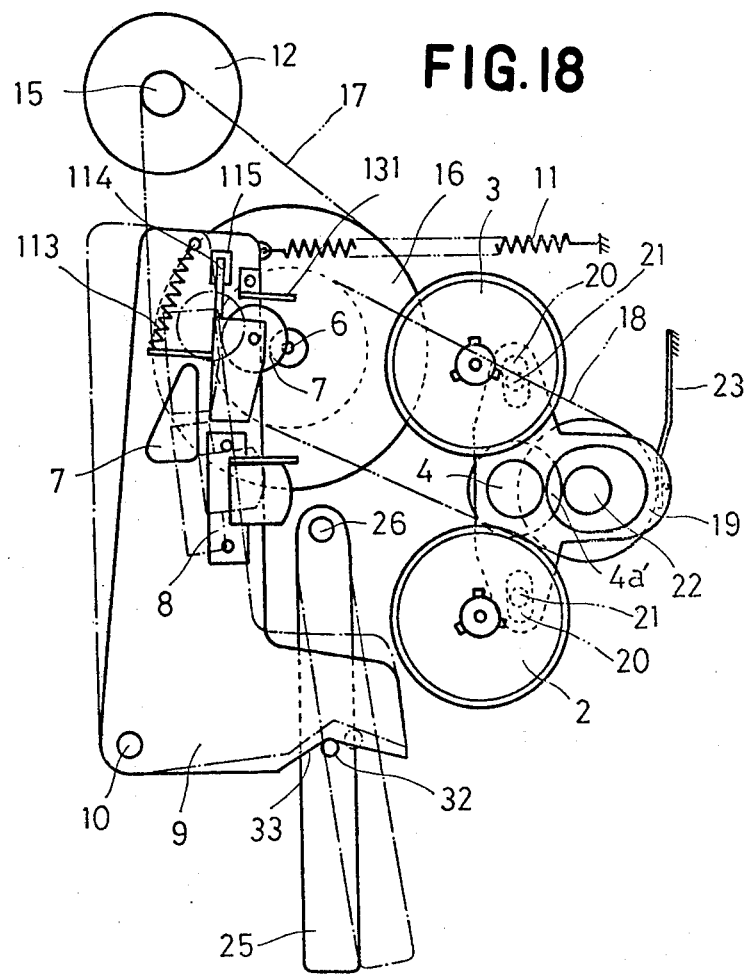

Let it now be supposed that the fast feed and rewinding switch SW4 is connected to the contact a. Then, the motor constant-speed control circuit E is disconnected, and the constant-speed control generator FG of this circuit is prevented from functioning. Actuating signals are impressed on the bases of the transistors TR8 and TR11 of the motor normal — reverse control circuit E, to render these transistors conductive. As the result, a current flows through the motor 12 from the left towards the right as viewed in the figure, and the motor is rapidly driven in one direction. Likewise, when the switch SW4 is thrown to the contact b, actuating signals are impressed on the transistors TR9 and TR10 of the motor normal — reverse control circuit E, and these transistors are rendered conductive. As the result, a current flows through the motor 12 from the right towards the left as viewed in the figure, and the motor is rapidly driven in the other direction. In such way, the normal rotation drive and the reverse rotation drive of the single motor 12 are controlled by the single switch. The capstan 6 and the reel rests 2 and 3 are driven in dependence on the direction of rotation, and the fast feed and the rewinding of the tape are executed. Merely by changing the switch SW4, the motor normal — reverse control circuit D is disconnected from the motor constant-speed control circuit E, and the constant-speed control generator FG is prevented from functioning, whereby the rapid drive can be established. Therefore, the change-over from the constant-speed drive to the rapid drive, i.e., to the fast feed and the rewinding can be made by this very simple circuit arrangement. Advantageously, the various operations are reliably attained by selecting the contacts a, b and c of the switch SW4. The mechanism is compactly constructed with the minimum number of contacts, and undergoes few operating difficulties. Either of the light emitting diodes $LED_1$ and $LED_2$ luminesces in response to the direction of the current, and the tape travel direction responsive to the motor drive direction is indicated. A control lever for the change-over from the tape constant-speed drive to the rapid drive, i.e., to the fast feed and rewinding is illustrated at 25 in FIGS. 1, 2, 3 and 15A. The control lever 25 is pivotally supported on the chassis 1 by an arbor 26. It can be pushed rightwards and leftwards along a slot 27 which is formed in the front surface of the chassis 1. In addition, it is normally centered by a leaf spring 29 which sandwiches both side parts 28 of the lever 25. The transfer contacts a and b of the switch SW4 are actuated by such lever 25. The switch SW4 is normally connected to the contact c by the center holding means, to construct the tape constant-speed drive control circuit. It is equivalent to the manipulation of the movable contact e of the change-over circuit that the control lever 25 is pushed rightwards or leftwards against the elasticity of the leaf spring 29. The switch is changed-over to the contact a or b in conformity with the direction of the manipulation, and the rapid rotation and the normal or reverse rotation of the motor 12 are controlled as previously stated. Accordingly, by manipulating the lever 25, the user can achieve the fast feed or the rewinding of the tape as desired. Further, the lever 25 moves the head plate 9 each time it is subjected to the fast feed or rewinding manipulation. An example of such movement is shown in FIG. 18. A pin 32 on the lever 25 contacts with a pin guide 33 provided in the head plate 9. Thus, with the rightward or leftward movement of the lever 25, the pin 32 presses the guide 33 so that the head plate 9 is moved about the arbor 10 to a retreated position as shown by a one-dot chain line in FIG. 18 whereat the head 8 and pinch roller 7 are spaced from the tape T. As a result, the tape fast-feed or rewinding drive owing to the manipulation of the lever 25 is executed without hindrance. When the lever 25 is set free from the rightward or leftward pushing manipulation, it returns to the center again by the elastic force of the leaf spring 29. The head plate 9 returns to the original position, and the pinch roller 7 is again urged against the capstan 6. The connection to the tape constant-speed drive control circuit system is established again. This circuit system including an amplifier circuit is disposed at a side part of the chassis 1 as indicated by a numeral 35 in the drawing, while a power circuit system therefor is disposed at a rear part 36. Numeral 38 designates a shaft of a volume control knob 92. All the tape drives stated above are made directly by the single capstan 6. As illustrated in FIGS. 18 to 21 and as apparent from FIG. 1, the position of the capstan 6 can be set only on the side of the reel rest 3 or the reel rest 2 in view of the standards of tape packs at the present time. Such structural restriction and the one-capstan system itself can become the cause of a tape entanglement at the tape drive. In the illustrated embodiment, the capstan 6 is disposed on the side of the reel rest 3. In this structure, in the case of winding the tape T on the side of the reel rest 3, the entanglement troubles arise on comparatively rare occasions. Conversely in the case of winding the tape T on the side of the reel rest 2, a tape contact friction by the head 8 located on the tape delivery side of the capstan 6 becomes a load, and the winding torque of the reel rest 2 is enfeebled to that extent. When, nevertheless, the tape drive of the same state is continued by the capstan 6, the tape gradually gets loose between the capstan 6 as well as the pinch roller 7 and the head 8. In the worst case, the tape become entangled round the outer periphery of the capstan 6 and/or pinch roller 7 several times over, resulting in the drawback of severance of the tape. In order to prevent such tape entanglement, this invention takes note of the fact that, as previously stated, the tape entanglement is chiefly attributed to the reduction of the taking-up torque of the reel rest 2 as caused by the tape contact friction of the head 8, in other words, to the imbalance between the torques of the reel rests 2 and 3, in setting or designing the torques of the reel rests 2 and 3, the invention adds to the reel rest 2 the amount of torque reduced by the head friction so that the torque of the reel rest 2 may become greater by that amount than the taking-up torque of the reel rest 3. Thus, the reel rest 2 effects the tape winding at the usual taking-up torque. In the prior-art auto-reverse mechanism, the winding torques of the reel rests 2 and 3 need be designed to be always equal in the strict sense. This invention can prevent the tape entanglement structurally simply and reliably in such way that, in constructing the auto-reverse mechanism with the single capstan, the taking-up torques of the reel rests 2 and 3 are set in accordance with the theory mentioned above.

The reel rests 2 and 3 have a particularly designed friction transmitting mechanism of a driving wheel and a taking-up hub. FIG. 22 shows a concrete construction of the reel rest, wherein the reel rest 3 is depicted in section. A collar 45 is rotatably fitted on a fixed shaft 40. A driving wheel 120 is rotatably mounted on the base part of the collar 45. Friction members 121 and 122 are arranged in contact with the upper and lower surfaces of the driving wheel 120, respectively. The friction member 122 contacting with the lower surface of the driving wheel 120 is annularly mounted on the upper surface of a disc 123 integral with the base part of the collar 45. On the other hand, the friction member 121 contacting with the upper surface of the driving wheel 120 is annularly mounted on the lower surface of a disc 124 rotatably fitted on the collar 45. The two friction members 121 and 122 sandwich therebetween and hold the driving wheel 120. Further, a reel vane 41 is loosely fitted on the upper part of the collar 45 so as to rotate integrally with the collar 45. Between the underside of the reel vane 41 and the upside of the friction member mounting disc 124, a coiled spring 43 is interposed in a compressed state. The disc 124 is pressed by the elastic force of the spring 43, so that the friction member 121 of the disc 124 is held in pressed contact with the upper surface of the driving wheel 120. Also, the pressing force brings the lower surface of the driving wheel 120 and the friction member 122 of the disc 123 into pressing contact. As shown, the disc 124 has a raised, truncated conical shaped spring receiving area. The friction member 121 is arranged at the foot part of such disc. The summit part of the disc 124 is pressed by the spring 43. Thus, the spring pressure is effectively applied to the friction member 121. In addition, the disc 124 itself is made of, for example, an elastic material. Thus, the friction members and the driving wheel 120 are always held in close and pressing contact. The upper end of the spring 43 is retained and engaged in an engaging groove 42 annularly formed in the lower surface of the reel vane 41, so that the spring 43 is prevented from getting out of position. An engaging groove is formed at the outer periphery of the upper end of the shaft 40 and a stopper 44 is disengageably fitted in the engaging groove, so that the reel rest assembly of the above construction is prevented from coming off the fixed shaft 40. Ths upper surface of the reel vane 41 of the reel rest has the upper limit controlled by the stopper 44, so that the upper-limit rotation position is always ensured. On the other hand, the bottom position of the driving wheel 120 is defined by a lower cradle 40a of the shaft 40 which rests against the bottom of the disc 123. The upper surface of wheel 120 is resiliently held by the pressure applying force of the spring 43, so that the lower-limit rotation position thereof is always ensured. Thus, the reel rests 2 and 3 are always rotated at desired accurate positions. In particular, the driving wheel 120 has both the surfaces thereof held by and between the friction members 121 and 122 respectively mounted on the discs 124 and 123. Therefore, wheel 120 is free from vertical oscillations and vibrations and it is stably rotated at a fixed position owing to the multiple action of the spring 43. By detaching the stopper 44 from the shaft 40, the reel rest 2, 3 constructed of the various components can be easily removed from the shaft 40. Likewise, each of the reel rests 2, 3 can be set at a fixed position by fitting it on the shaft 40 and mounting the stopper 44.

In this manner, the assembly and disassembly of the reel rests 2, 3 are very simple.

Further advantages are efficiency in manufacture and ease in exchange of components. For example, the adjustment of the taking-up torque of the reel rest 2 or 3 can be made very simply in such way that the spring pressure is adjusted by changing the level of the fitting position of the reel vane 41, changing the resilience of the spring 43, or replacing the reel vane 41 with one the spring receiving part of which lies at a higher or lower position, such that the pressing contact forces of the friction members 121 and 122 are adjusted. The above mechanism is common in the reel rests 2 and 3. As previously stated, the present apparatus involves an auto-reverse tape recorder in a single-capstan drive system. Therefore, the taking-up torque of the reel rest 2 located on the side of the head 8 is made greater than the taking-up torque of the reel rest 3 located on the side of the capstan 6 through the aforesaid adjustment of the taking-up torques, thereby to prevent the looseness of the tape between the capstan 6 and the head 8 in the case of taking up the tape by the reel rest 3.

As already stated, the printed wiring board 24 for the rotation detecting switch SW2 is provided on one of the reel rests 2 and 3. Specifically, the printed wiring board 24 is integrally fitted on the underside of the disc 123 as is the lowermost surface of the reel rest 2. Its surface with the conductor disposed thereon opposes a hole formed in the chassis 1 and a hole 125 formed in the printed wiring board 130, which also aligns with the hole in the chassis. The contact pieces of the switch SW2 arranged on the underside of the chassis 1 are held in contact with the rotation-detecting printed wiring board 24 through the hole 125. In such manner, the printed wiring board 24 is mounted directly on the disc 123 which is a driven wheel of the reel rest, so as to rotate integrally with the driven wheel. Thus, the rotation of the printed wiring board as attendant upon the rotation of the reel rest is always attained cooperatively. The rotation detection is thus free from nonuniformity, and is precise. Moreover, no large space is occupied for the mounting, and the structure is compact.

The conspicuous difference in mechanism between the reel rests 2 and 3 resides in a back tension mechanism to be described below. The back tension mechanism is provided for the reel rest 3 on the side of the capstan 6. It serves to prevent the looseness of the tape between the capstan 6 and the reel rest 3 as arises mainly in case of taking up the tape by the reel rest 2. Besides the back tension effect, it has the action of holding the reel rest horizontally. Structurally it is far more compact than prior-art back tension mechanisms and it utilizes the thickness of the reel rest, and hence, it is advantageous in that no large space is required. A concrete construction of the back tension mechanism can be known from FIGS. 1, 21 and 22. A rubber ring 127 which the idler 4 touches is provided at the outer periphery of the driving wheel 120. At this outer periphery, a groove 126 is annularly formed in juxtaposition to the rubber ring 127 by exploiting the thickness of the driving wheel 120. A member 128 made of an elastic material is held in pressing contact with the groove 126. As shown, the pressing contact member 128 is juxtaposed horizontally to the groove 126. It is mounted in a readily exchangeable state with its base part grasphed by a mounting member 129. Its fore end is pressedly contacted with the groove 126. The reel rest 3 rotates with a certain braking bestowed thereon in such a way that the pressing contact member 128 and the groove 126 are normally held in pressing contact during the rotation. As regards the braking force, the pressing contact force of the pressing contact member 128 can be brought into the optimum state by, for example, the exchange of the member 128. In case of winding the tape T by the reel rest 3, usually the tape T is pressingly contacted with the head face and is thus braked by means of the head 8 and a tape keeper pad pressingly contacted with the head. It is in the state in which a back tension is normally applied thereto. Therefore, the tape looseness between the capstan 6 and the reel rest 2 is not a frequent problem. In the converse case of winding the tape by the reel rest 2, however, the tape T has no braking bestowed thereon and receives no back tension between the reel rest 3 and the capstan 6 because, due to the one-idler mechanism of the apparatus, the idler 4 merely touches the reel rest 2 and transmits a rotation driving force thereto and the reel rest 3 becomes quite free. Therefore, the tape is subject to becoming loose between the reel rest 3 and the capstan 6. Simultaneously with meandering due to the looseness, the tape T is subject to vertical motions. The tape entanglement arising around the capstan 6 and the pinch roller 7 is mainly attributed to the meandering and the vertical motions ascribable to such tape looseness.

The back tension mechanism disposed on the side of the reel rest 3 acts very effectively in order to prevent the tape looseness which arises in the case of taking up the tape T by the reel rest 2. Since the mechanism controls the reel rest directly, the braking is reliable. The mechanism also maintains the horizontal rotation of the reel rest, and the tape is delivered more stably. More specifically, the rotation of the reel rest 3 is controlled by the groove 126 which is provided at the outer periphery of the driving wheel 120 and the elastic member 128 which pressingly contacts and engages with the groove 126, so that vertical oscillations of the reel rest 3 are effectively prevented. Owing to the adoption of the mechanism in which the groove 126 is provided directly in the reel rest and the fine stick-shaped elastic member 128 is merely engaged therewith, the back tension mechanism is remarkably simplified. Moreover, since the wall thickness of the reel rest is utilized, the space required for the back tension mechanism is small.

Figure 19:
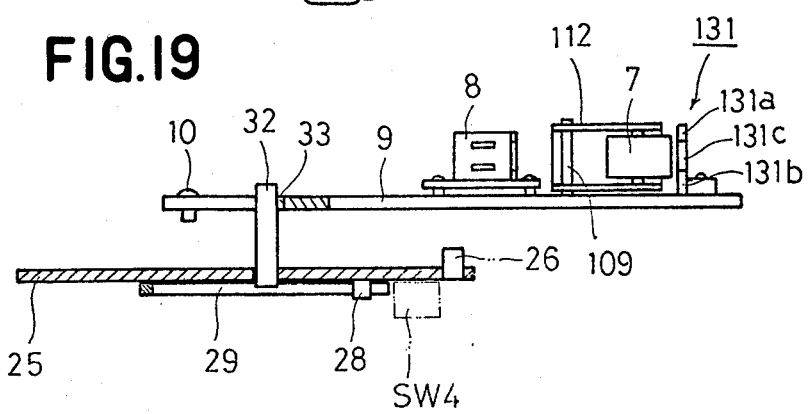
FIG. 19 is a sectional view corresponding to FIG. 18, FIGS. 20 and 21 are plan views illustrating tape drives.

In addition to such back tension mechanism, the apparatus of this invention is provided, in order to prevent tape entanglement more effectively, with upper and lower tape edge controlling means 131 for preventing vertical movement of the tape T (see, for example, FIG. 19). The upper and lower tape edge controlling means 131 has fingers 131a and 131b which control the upper and lower edges of the tape T, respectively. The tape is held between the fingers 131a and 131b, and an outward movement of the tape T is controlled by an inner face 131c which joins both the fingers. The upper and lower tape edge controlling means 131 is characterized by being situated on the side of the reel rest 3 and being disposed in close proximity to a tape entrance portion between the capstan 6 and the pinch roller 7. Since, as already described, tape entanglement occurs around the pinch roller 7 and the capstan 6, the tape T is always pressedly and driven at the normal positions of the capstan 6 and the pinch roller 7 by regulating the upward and downward tape motions in the tape entrance portion between roller 7 and capstan 6. By the combination of the action of such upper and lower tape edge controlling means 131 and the action of the back tension mechanism, looseness and vertical movement of the tape is reliably prevented. Therefore, tape entanglement, which arises in the vicinity of the tape entrance portion of the capstan 6 and the pinch roller 7 when recording or playback is being performed by winding the tape by means of the reel rest 2, is perfectly prevented. As illustrated, the upper and lower tape edge controlling means 131 is mounted on the head plate 9 and moves integrally therewith. When the tape pack C is inserted into the container 46, the means 131 is caused to enter into the tape pack from the container 46 with the advance of the head plate 9 and regulates the upper and lower edges of the tape. When the tape pack C is ejected, the means 131 retreats externally of the container with the retreat of the head plate 9 from the recording and playback position and it is maintained in such retreated position.

Further, this invention provides a specific mechanism as to an actuating mechanism of the container for packing the tape. In, for example, the cassette type tape recorder, there has hitherto been a system in which the tape container is usually held at the upper position and in which when the tape container is loaded with the tape pack, it moves to the lower position so as to establish the recording or playback state. The most serious disadvantage of such system is that a container actuating mechanism which moves the container from the upper stand-by position to the lower recording and reproduction position and which returns from the lower position to the upper position and ejects the tape pack is constructed of a huge number of components, complicated linkage, springs, etc. This causes another important bottleneck to the miniaturization of the equipment and the reduction of the manufacturing cost, and brings about many operating problems. In view of such situation, this invention provides the container and the actuating mechanism thereof in which the organization is extraordinarily rationalized and simplified and stabilization of the operation is achieved. As apparent from FIGS. 1, 2, 3 and 16, the container 46 is mounted on a suspending plate 47 by plate springs 48. The suspending plate 47 has its base part mounted on an anchoring plate 50 by a plate spring 49, the plate 50 being erected on the chassis 1. A tape pack keeper or anchoring plate 134 is provided on the suspending plate 47. The tape pack keeper 134 consists of an elastic supporting piece 134a one end of which is attached to the supporting plate 47 by, for example, screws, and a pushing piece 134b which is made of, for example, a synthetic resin material and which is mounted on the underside of the other end of the supporting piece 134a. In correspondence with the pushing piece 134b, a window 135 is provided in the ceiling plate of the container 46. When the container 46 moves from the upper stand-by position shown in FIG. 2 to the lower stand-by position shown in FIG. 3 and the suspending plate 47 moves to a frontwardly inclined state, the pushing piece 134b goes into the container 46 through the window 135 and pushes the upper surface of the tape pack C inserted in the container 46. Thus, the pushing piece supports the tape pack C on the inside bottom surface of the container by a downward force thereof so that the tape pack may be prevented from moving unnecessarily within the container 46 during recording and playback. The stabilization of the tape pack during recording and playback is accordingly achieved.

As shown in FIG. 2, the container 46 is usually supported by the suspending plate 47 and stands by at the upper position. When a downward moving force is bestowed on the container 46, the plate springs 48 and 49 bend against the elasticity, the suspending plate 47 falls into the frontwardly inclined state, and the movement of the container to the lower position is permitted. When the downward moving force is released and an upward moving force is applied, the plate springs 48 and 49 return and the container 46 is caused to stand by at the upper position again. The tape pack keeper 134 is formed by exploiting the fact that when the container 46 moves to the lower recording and playback position, the suspending plate 47 falls into the frontwardly inclined state.

On one side of the container 46, there is mounted a slide member 51. A guide pin 53 erected on the container is loosely fitted in a slot 52 provided in the slide member 51, whereby sliding movement of the slide member 51 is guided. On the other hand, a spring 54 normally urges the slide member 51 towards a tape pack inserting port 55 of the container 46. The slide member 51 has a tape pack sensing portion 56 which extends towards the interior of the container 46 and which protrudes into a tape pack receiving chamber. When the tape pack is inserted into the container 46, an end face of the tape pack abuts against the sensing portion 56 in the process of advancing the tape pack frowards. When the tape pack is still advancing, the slide member 51 slides on the container side against the force of spring 54 with the advance. On the other hand, the slide member 51 is provided with a guide piece 57 which protrudes from the side thereof. On the chassis 1, a container supporting member 60 is provided. The container supporting member 60 has a guide 58 which supports the guide piece 57 and which guides frontward and rearward movements, and a guide 59 which is formed in continuation to the guide 58 and which guides upward and downward movements. With the advance of the tape pack, the slide member 51 is moved firstly by being led by the guide 58. When the terminus of the guide 58 is reached, the guide piece 57 falls according into the vertical guide 59. Thus, the container 46 descends from the upper position to the lower position. One side of the container 46 is always supported in the stand-by state by such supporting means. The stroke of the guide piece 57 by the frontward-and-rearward guide 58 and the guarantee of the vertical position by the upward-and-downward guide 59 are achieved by a stopper 132. The stopper 132 is situated at the end of the frontward-and-rearward guide 58 of the container supporting member 60, and is juxtaposed to the upward-and-downward guide 59. As the guide piece 57 is being led by the guide 58, it begins to move from a left dead point in FIGS. 2 and 3, it arrives at a right dead point, and it arrives at a vertical movement position. The stopper 132 serves to check the guide piece 57 from excessively advancing beyond the right dead point.

As shown, the stopper 132 is erected on the container supporting member 60, and it protrudes above the plane of the frontward-and-rearward guide 58. One side surface of the stopper 132 defines a groove of certain depth to form the upward-and-downward guide 59. When the guide piece 57 reaches a lower dead point of the vertical guide 59, the container 46 is set at the normal lower recording and playback position. At this time, the stopper 132 also has the action of holding the guide piece 57 at the fixed position so as to prevent it from unnecessary moving due to an impact etc. Where the tape pack C is inserted by, for example, an unnecessarily strong force, it may well be considered that the guide piece 57 will be excessively advanced beyond the right dead point of the frontward-and-rearward guide 58, so that the normal position of the tape pack C will not be secured or that the equipment will be damaged. However, the tape pack is always inserted and advanced to the fixed position by the foregoing action of the stopper 132, whereupon the tape pack is reliably set at the lower recording and playback position by the actions of the vertical guide 59 and a downward force bestowed on the container 46 as will be discussed below. The other side of the container 46 is supported by a guide piece 61 which protrudes from the other side of the container 46 or the other side of the suspending plate 47. By forcibly moving the guide piece 61 to the upper position and to the lower position, the container 46 is moved to the upper stand-by position and to the lower recording and playback position. The tape recorder of this invention comprises a new mechanism relating to such container actuating mechanism. It includes a tape pack eject mechanism for operating the slide member 51.

Figure 7:
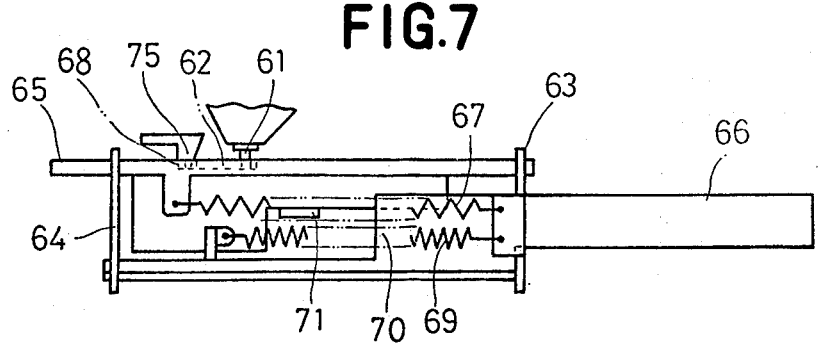
FIGS. 7, 8 and 9 are plan views of the container actuating mechanism as corresponding to FIGS. 4, 5 and 6, respectively.
Figure 8:
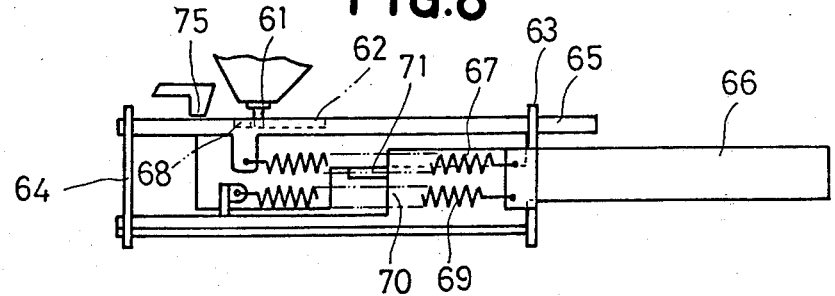
Figure 9:
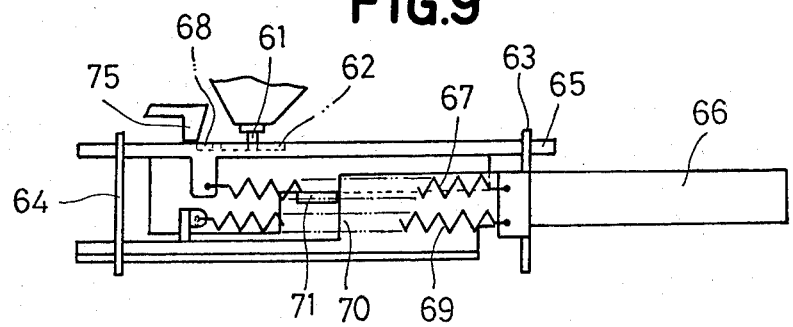
Figure 13:
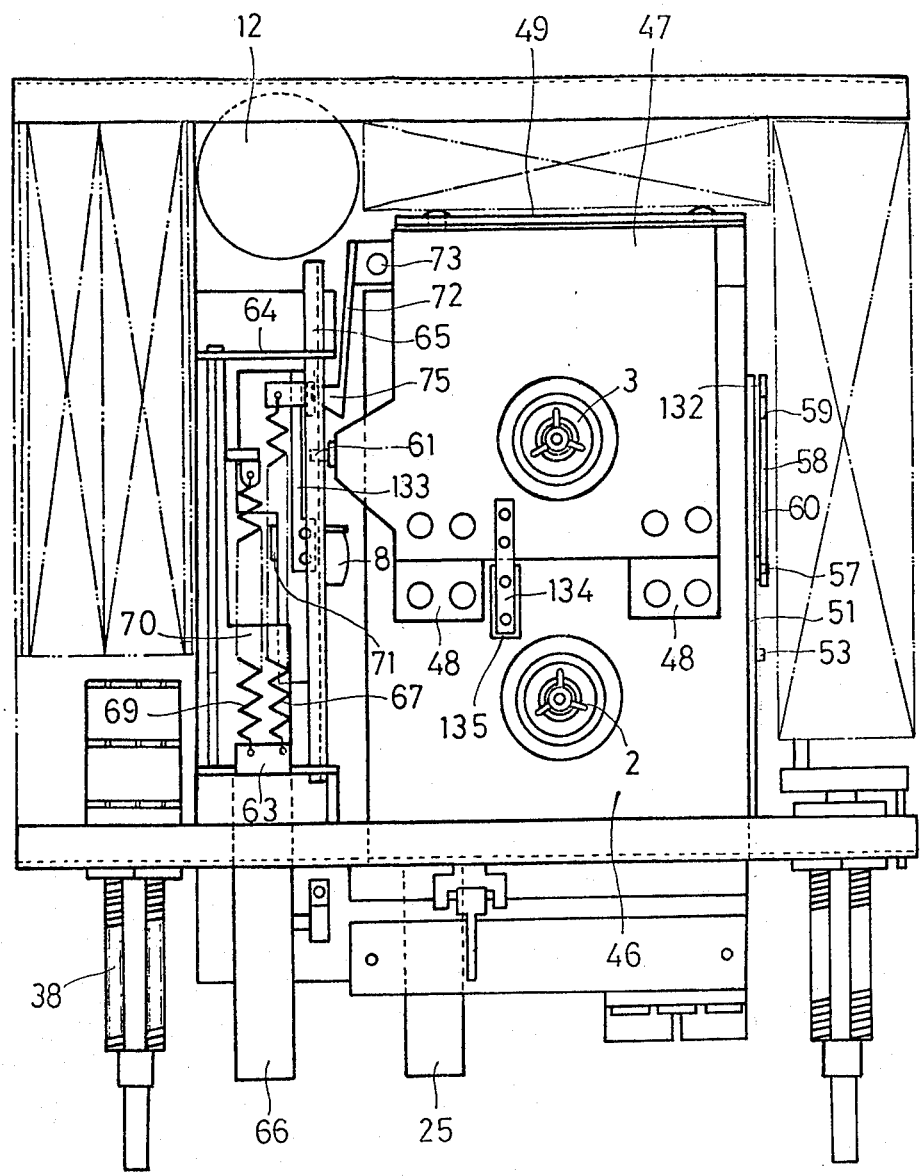
FIGS. 13 and 14 are plan views showing the states in which the container is at the upper and lower positions, respectively.
Figure 14:
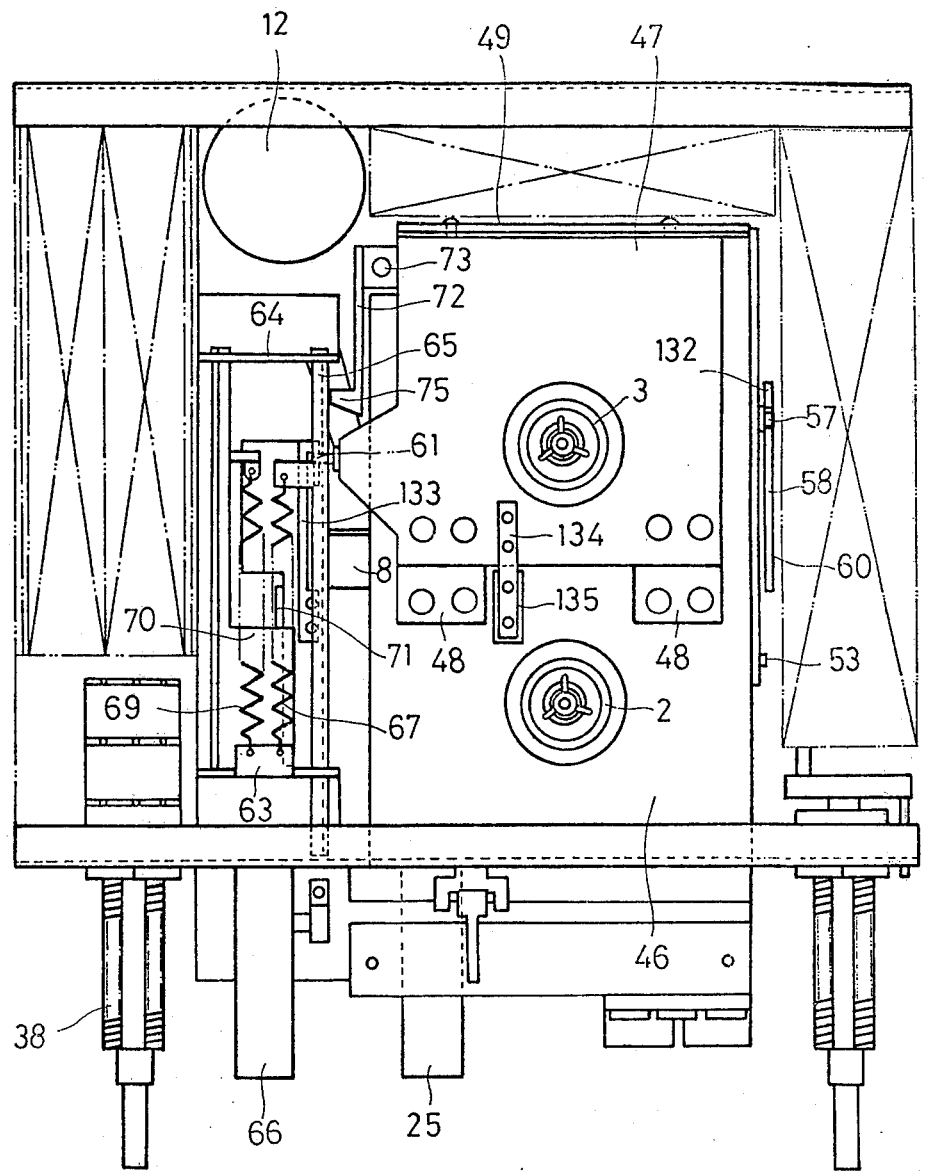

FIG. 1, FIGS. 4 to 9, and FIGS. 13 and 14 illustrate the construction and operating diagrams of such container actuating mechanism in detail in relation to the container 46. As shown, this mechanism consists of a container actuating member 65 which has cam means 62 for supporting the guide piece 61 and guiding it from the upper position to the lower position and which is supported in a manner to be capable of advancing to or retreating from anchoring plates 63 and 64 integral with the chassis 1, and an eject lever 66 which is juxtaposed to the container actuating member 65, which is supported in a manner to be capable of advancing to or retreating from the anchoring plates 63 and 64 and which is manipulated by the eject manipulation knob 116. The actuating member 65 and the eject lever 66 are normally urged in a direction of retreat or withdrawal by a spring 67 or 69, respectively. The actuating member 65 advances against the spring 67 and is stopped at the stand-by position in such a way that an engaging member 72 interlocking with the pack insertion and to be discussed below engages an engaging portion 68 provided at a side surface of the actuating member 65. Under this state, the guide piece 61 of the container is supported at the uppermost position of the cam means 62. Thus, the container 46 is held at the upper position and is put into the stand-by state. Also the eject lever 66 is supported so that it can be subjected to an advancing manipulation against the force of spring 69. By the advance manipulation, it can engage the container actuating member 65 and move it from the retreat position to the advance position. More specifically, reference numeral 70 designates an engaging portion provided in the eject lever 66, while reference numeral 71 denotes an engaging portion provided in the container actuating member 65 in correspondence with the engaging portion 70. When the actuating member 65 lies at the retreat position, that is, when the guide piece 61 is situated at the lowermost position of the cam means 62 and the container 46 is moved to the lower position, the engaging portion 70 and the engaging portion 71 of the actuating member 65 are in the position of engagement as shown in FIGS. 5, 8 and 14. By the advance manipulation of the eject lever 66, therefore, the actuating member 65 can also be advanced as shown in FIGS. 6 and 9. When the actuating member 65 completes the advance, an engaging member 72 to be described below engages the engaging portion 68 as shown in FIGS. 4, 7 and 13, and the container 46 falls into the upper position or stand-by state. When the advance manipulation of the eject lever 66 is stopped, the lever 66 is urged by the spring 69 and returns to the original position. As shown in the FIGURES, therefore, the engaging portions 70 and 71 depart from each other, and the eject lever 66 can only advance or retreat singly. The engaging member of the actuating member 65 is shown at 72 in the drawing. It is pivotally supported on the chassis 1 by an arbor 73 in a manner to be rockable thereabout. An engaging tendency is bestowed on a front end engaging portion 75 of the engaging member 72 by a spring 74. The engaging portion 75 engages the engaging portion 68 of the actuating member 65. The engaging member 72 has a portion 76 which senses the tape pack insertion and which extends at a hind part of the container 46. A rear end part 77 of the slide member 51 corresponds to the portion 76. The sensing portion 76 is pushed by the rear end part 77. Thus, the engaging member 72 is turned against the spring 74 in the direction of releasing the engagement.

When the tape pack has been ejected, as already described the container actuating member 65 is kept advanced against the urging force of the spring 67. The front end engaging portion 75 of the engaging member 72 is engaged with the engaging portion 68, to hold the advance position. The guide piece 61 is supported at the uppermost position of the cam means 62, while the guide piece 57 is supported on the guide 58 of the supporting member 60. The container 46 has both the sides supported and is in the upper position or stand-by state. When, under such state, the tape pack is pushed and advanced into the container 46, as already stated the front end of the tape pack pushes the tape pack sensing portion 56 of the slide member 51. The guide piece 57 slides while being supported by the guide 58. When it reaches the vertical guide 59, the rear end 77 of the slide member 51 pushes the sensing portion 76, thereby to turn the engaging member 72 with the fulcrum at the arbor 73 and to release the engagement of the engaging portion 68. As the result of the release of engagement, the container actuating member 65 is instantly moved to the retreat position by the tension of the spring 67. Retreating by the amount of stroke of the cam means 62, a stopper portion 81 abuts against an engaging portion 82 and secures the retreat position. The engaging portion 71 of the actuating member 65 and the engaging portion 70 of the eject lever 66 fall into the state of engagement. At the same time, as shown in FIGS. 3, 5, 8 and 14, the guide piece 61 is subjected to the downward force of the spring 67, and it is moved to the lowermost position of the cam means 62 and is resiliently supported. Also the guide piece 57 slides and falls along the vertical guide 59 of the supporting member 60 by the downward force of the spring 67, and it is resiliently supported in engagement with a lower position supporting portion 78. In consequence, the container 46 is moved from the upper position to the lower position. It has both the sides thereof supported and is stably located and resiliently supported at the recording or playback position by the downward force of the spring 67. Then, the recording or playback operation is started. At this time, owing to the engagement of the guide piece 57, the tape pack sensing portion 56 is situated at the tape pack rear end under the state under which an elastic force is stored. In order to support the container 46 more stably, the actuating member 65 is provided with means 133 for securely holding the guide piece 61 at the lower position of the cam means 62. The guide piece holding means 133 is in disengagement from the guide piece 61 when the container 46 lies at the upper stand-by position. However, when the actuating member 65 moves following the spring 67 and the guide piece 61 moves to the lower position of the cam means 62, the means 133 engages the guide piece 61 and holds it by a downward urging force. It is desirable that the guide piece 61 engages the cam means 62 as closely as possible. In order to acquire a smooth movement of the guide piece 61, however, the cam means 62 and the guide piece 61 are engaged deliverately with some clearance in design. Although such clearance is effective for acquiring the smooth movement of the guide piece 61, it is unfavorable for the stable support of the container 46 because it permits the motion of the guide piece 61. The guide piece holding means 133 effectively prevents the occurrence of such situation. As shown, the guide piece holding means 133 is constructed of an elastic supporting piece 133b which has an engaging pawl 133a at the fore end. The base end of the means 133 is mounted on the actuating member 65. The engaging pawl 133a presents such shape as to bend while opening towards the guide piece 61. When the guide piece 61 lies at the upper position of the cam means 62 as shown in FIG. 4, the engaging pawl 133a stands by rearwardly of piece 61. When the guide piece 61 moves to the lower position of the cam means 62, the pawl 133a advances with the actuating member 65 and engages into the guide piece 61 as shown in FIG. 5. It holds the guide piece 61 fixed at the lower position of the cam means 62. That is, the guide piece 61 is engaged against the elasticity of the engaging pawl 133a or the supporting piece 133b. It is pressed at the lower fixed position of the cam means 62 by the downward urging force of the engaging pawl 133a or the supporting piece 133b. Thus, it is prevented from moving due to looseness between piece 61 and cam means 62.

As already stated, the guide piece 57 is supported on the lower position supporting part 78 of the guide 59, the guide piece 61 is supported at the lowermost position of the cam means 62, both the sides of the container 46 are supported by the guide pieces 57 and 61, and the downward force of the spring 67 is bestowed on the guide pieces 57 and 61. Therefore, along with the action of the construction of the stopper mechanism 132, the container 46 and the tape pack C inserted within the container are reliably held in the recording and reproduction position. Further, the guide piece 61 is reliably held at the fixed lower position of the cam means 62, whereby the guide piece 61 supports the container more stably without inducing any rattle even due to vibrations, shocks etc. A reproduced sound or recorded source of high precision is accordingly achieved. In addition, the plate spring 48 of the suspending plate 47 falls into a flexed state and produces a downward force to press the upper surface of the container 46. This also promotes the stable support of the container 46 at the recording and reproduction position. As already stated, when the container 46 lies at the lower recording and reproduction position, the suspending plate 47 falls into the frontwardly inclined state, and the pushing piece 134b of the tape pack keeper 134 attached to the suspending plate 47 enters into the container 46 and touches the upper surface of the tape pack C inserted therein. By the contact of the pushing piece 134b, the supporting piece 134a is curved against the elastic force and generates a strong downward urging force. Owing to the downward force the tape pack C is normally secured closely to the inside bottom of the container 46, so that the stabilization of the tape pack at the recording and reproduction position can be attained.

Figure 11:
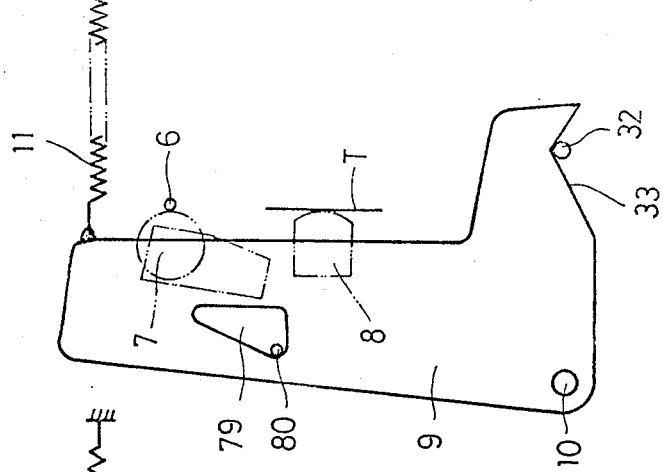

Further, the actuating member 65 is provided with a slide fit piece 80 which is extended towards the head plate 9 and which engages cam means 79 provided on the head plate 9. The slide fit piece 80 moves with the movement of the actuating member 65, and causes the head plate 9 to move. As shown in FIG. 11, the piece 80 pressingly secures the pinch roller 7 to the capstan 6 and bring the head 8 into contact with the tape. Therefore, the recording or reproduction operation is performed without hindrance. In view of such function, the container actuating member 65 may also be called the head plate actuating member. It is also possible, however, that only the function of actuating the container is bestowed on the actuating member 65 and that the head plate actuation operation is left to another means.

Figure 10:
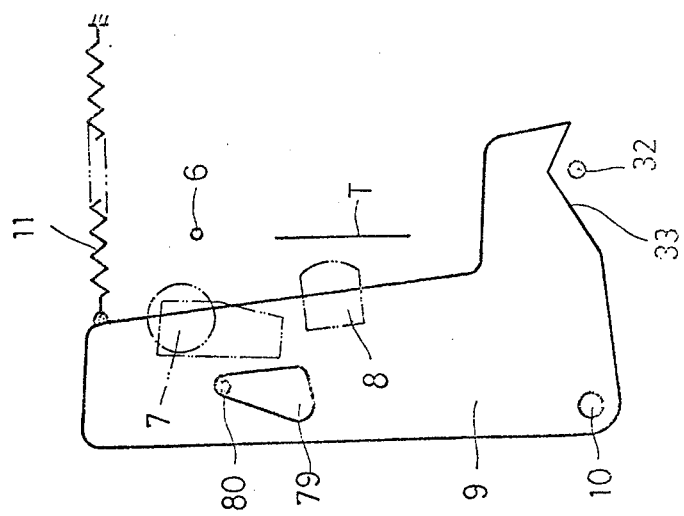
FIGS. 10, 11 and 12 are plan views of states of a head plate corresponding to FIGS. 4, 5 and 6, respectively.
Figure 12:
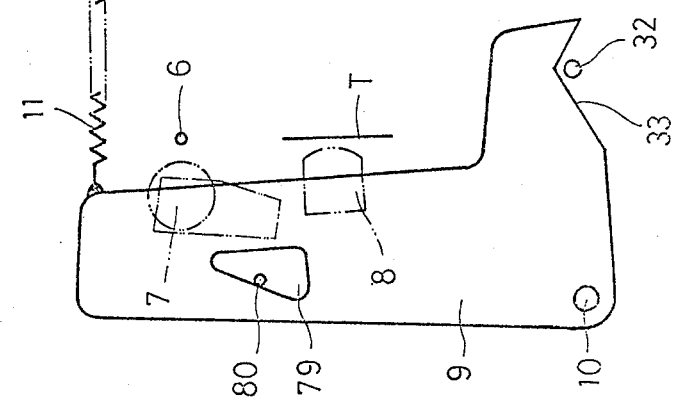

When, under such recording or reproduction state, the eject lever 66 is advanced against the urging force of the spring 69, the actuating member 65 is also advanced against the spring 67 owing to the engagement between the engaging portions 70 and 71 as shown in FIGS. 6 and 9. As the result, the guide piece 61 of the container 46 is forcibly moved upwards by the guide of the cam means 62, and the engaging portion 75 of the engaging member 72 is guided by the side surface of the actuating member 65 and is finally engaged into the engaging portion 68. As a result, the advance position of the actuating member 65 is held, and the guide piece 61 is situated at the uppermost position of the cam means 62. Simultaneously therewith, the guide piece 57 has the engagement released, and it goes from the upward-and-downward guide surface 59 to the frontward-and-rearward guide surface 58. Thus, the already-explained high position support state of the container 46 as shown in FIGS. 2, 4, 7 and 13 is established. Simultaneously therewith, the guide piece 57 has the engagement released, so that the tape pack sensing portion 56 is urged by the stored tension of the spring 54 and strongly pushes the rear end of the tape pack C. In consequence, the tape pack C is ejected from the inserting port 55, and the recording or reproduction stand-by state is established again. At this time, the slide fit piece 80 moves with the advancing motion of the actuating member 65, the head plate 9 is moved against the spring 11 as shown in FIG. 10 via a process shown in FIG. 12, and the pinch roller 7 is separated from the capstan 6 while the head 8 is retreated from the tape. In this manner, the container actuating mechanism actuate the container 46 and the eject means by the principal components of the actuating member 65 and the eject lever 66. Moreover, both the components advance and retreat rectilinearly, so that the number of parts is very small and that the mechanism is simplified. In addition, the mechanism can be operated in a very small space, which is very advantageous for accomplishing the miniaturization of the equipment. Besides, operating problems of the equipment decreases, and the reliability rises. Besides such mechanism, the guide pieces 57 and 61 are provided. The container 46 has both the sides supported indirectly through the cam 62 by the downward force of the spring 67. Therefore, the container is supported extraordinarily stably, and the precision of the recording and reproduction operation is enhanced.

By employing such container actuating mechanism in combination with the foregoing tape drive mechanism as well as control circuit thereof, the equipment is miniaturied still more and it is reduced in cost. Moreover, by controlling the single motor, the single capstan and the single idler by the new means and method, the auto-reverse operation is attained rationally and stably. In view of the very complicated and difficult reverse mechanism of the prior-art article, it will be understood that the article of this invention is advantageous in all respects.

As already stated, this invention has a very small number of components, is simple in construction and can effectively prevent the entanglement of the tape. Therefore, it can greatly contribute to the reduction of cost of the equipment and the miniaturization of the equipment.

We claim:

1. A magnetic recording and reproducing apparatus comprising:
 a substrate;
 a tape pack inserting container having a space therein for receiving a tape deck and being supported over said substrate in a manner to be movable between a lower recording or playback position and an upper recording or playback stand-by position;
 container actuating mechanism means for moving said container vertically between said upper and lower positions in relation with loading and ejection of said tape pack;
 container supporting means for stably supporting both opposite lateral sides of said container in both said lower position and said upper position thereof as well as during movement thereof between said positions;
 a head plate supported to be movable between a recording or playback position and a recording or playback stand-by position;
 spring member means for constantly biasing said head plate toward said recording or playback position;
 head plate actuating means for moving said head plate to said recording or playback position by utilizing the force of said spring member means or to said recording or playback stand-by position against the force of said spring member means, as a function of said container actuating mechanism means and in response to movement of said container to said recording or playback position or said recording or playback stand-by position thereof;

a track scanning head supported by said head plate;

a pair of rotatable reel rest means for taking up a magnetic tape of said tape deck in the forward or reverse directions thereof;

an assembly including a single capstan and a single pinch roller for causing said magnetic tape to travel in both said forward or reverse directions thereof, depending on the direction of rotation of said single capstan and single pinch roller;

a single idler located approximately midway between said pair of reel rest means;

movable support plate means, rotatably and slidably supporting thereon said single idler, for moving said single idler into contact with a selected either one of said reel rest means to transfer the driving force of said single idler to said one reel rest means;

a puller maintained in pressing contact with said single idler to provide said single idler with normal or reverse rotative force around the axis thereof and around said pulley;

a single motor;

means for transferring rotation of said single motor to said single capstan and to said single idler through said pulley; and a control circuit system comprising a motor constant-speed control circuit for controlling constant-speed drive of said magnetic tape, a motor normal-reverse control circuit for controlling the normal or reverse rotation of said motor, a single switching mechanism for, during constant-speed travel of the magnetic tape, supplying operation signals to said motor constant-speed control circuit to achieve constant-speed travel of said magnetic tape, and for, during fast feed and rewinding of said magnetic tape, actuating said motor normal-reverse control circuit to achieve rapid drive of said motor, and directly controlling the driving of motor through said motor normal-reverse control circuit, thereby causing normal or reverse drive of said motor, and thus enabling fast feed or rewinding operation of magnetic tape.

2. A magnetic recording and reproducing apparatus as claimed in claim 1, further comprising a tape pack anchoring plate including a pushing piece and mounted on a suspending plate which suspends therefrom said container, said container having therein a window at a position corresponding to said pushing piece and which allows the penetration thereinto of said pushing piece as said suspending plate assumes a frontwardly inclined position upon the movement of said container toward said recording or playback position thereof, such that said pushing piece presses against and stabilizes said tape deck when said container is in said recording or playback position thereof.

3. A magnetic recording and reproducing apparatus as claimed in claim 1, further comprising a rotation detecting switch including a first contact printed on a print circuit board rotating with either one of said reel rest means and a second contact corresponding to and contacting said first contact and performing periodic on-off operations upon rotation of said print circuit board and said one reel rest means.

4. A magnetic recording and reproducing apparatus as claimed in claim 1, further comprising an annular groove provided along the periphery of the tape-feed one of said pair of reel rest means, and a pressure member elastically pressed against said annular groove to apply a braking effect to the rotation of said tape-feed reel rest means.

5. A magnetic recording and reproducing apparatus as claimed in claim 1, further comprising means for changing-over from a first recording or playback state in which a track scanning operation is made by driving in a normal direction a multitrack magnetic tape wound on said two reel rest means to a second recording or playback state in which a different track scanning operation is made by driving said tape in a reverse direction when a tape end is reached, said changing-over means comprising a tape end detecting means for generating a first electric output signal during tape movement and for stopping generation of said output signal when a tape end is reached, a trigger circuit means for generating a trigger signal upon each reception of said first output signal, and a tape reversing instruction signal circuit for generating a second output signal the polarity of which is inverted upon each reception of said trigger signal and for controlling said motor normal-reverse control circuit according to said polarity, thereby controlling the normal or reverse drive of said single motor; and further comprising means for preventing slack in said magnetic tape upon winding said tape from one of said reel rest means to the other of said reel rest means between said single capstan and single pinch roller during said reverse recording or playback state, said slack preventing means comprising friction members respectively provided on said reel rest means in a manner as to allow rotation of said reel rest means and spring members pressing said friction members against said reel rest means, the pressing force of the respective said spring member on said other reel rest means being larger than the pressing force of the respective said spring member on said one reel rest means.

6. A magnetic recording and reproducing apparatus as claimed in claim 5, further comprising a tape drive direction instructing circuit means for controlling said trigger circuit means and said tape reversing instruction signal circuit, and for thereby determining the tape drive direction at the start of operation.

7. A magnetic recording and reproducing apparatus as claimed in claim 5, further comprising tape vertical movement limiting means, provided in the vicinity of the inlet of said tape between said capstan and pinch roller, for limiting the vertical movement of said magnetic tape; and back tension mechanism means for braking the rotation of said one reel rest means and for thereby preventing slack of said tape, thereby assuring stable drive of said magnetic tape in a recording or playback state wherein said magnetic tape is fed from said one reel rest means to said other reel rest means through said single capstan and pinch roller and then through said magnetic head.

* * * * *